(12) United States Patent
Fukuyama et al.

(10) Patent No.: US 7,002,736 B2
(45) Date of Patent: Feb. 21, 2006

(54) SCANNING OPTICAL MICROSCOPE

(75) Inventors: Hiroya Fukuyama, Sagamihara (JP); Takehiro Yoshida, Hachioji (JP)

(73) Assignee: Olympus Corporation, Tokyo (JP)

( * ) Notice: Subject to any disclaimer, the term of this patent is extended or adjusted under 35 U.S.C. 154(b) by 11 days.

(21) Appl. No.: 10/837,698

(22) Filed: May 4, 2004

(65) Prior Publication Data
US 2004/0201885 A1 Oct. 14, 2004

Related U.S. Application Data

(62) Division of application No. 10/025,973, filed on Dec. 26, 2001, now Pat. No. 6,751,016.

(30) Foreign Application Priority Data
Dec. 26, 2000 (JP) ............................. 2000-394934

(51) Int. Cl.
*G02B 21/00* (2006.01)
(52) U.S. Cl. ...................... 359/368; 359/389; 359/290; 250/201.9
(58) Field of Classification Search ................ 359/368, 359/385, 382–383, 387, 389, 290–291, 316, 359/636, 296
See application file for complete search history.

(56) References Cited

U.S. PATENT DOCUMENTS

| | | | | |
|---|---|---|---|---|
| 4,579,430 A | * | 4/1986 | Bille ........................... | 351/206 |
| 5,399,866 A | * | 3/1995 | Feldman et al. .......... | 250/458.1 |
| 6,381,074 B1 | * | 4/2002 | Yoshida ...................... | 359/661 |
| 6,771,417 B1 | * | 8/2004 | Wolleschensky et al. ... | 359/368 |
| 2003/0137725 A1 | * | 7/2003 | Mueller et al. ............. | 359/386 |

FOREIGN PATENT DOCUMENTS

JP  HEI-11-101942  4/1999

* cited by examiner

*Primary Examiner*—Mark A. Robinson
*Assistant Examiner*—Lee Fineman
(74) *Attorney, Agent, or Firm*—Pillsbury Winthrop Shaw Pittman LLP

(57) ABSTRACT

A scanning optical microscope using a wavefront converting element suffers minimum off-axis performance degradation and allows the wavefront converting element to be controlled by a simple method. Further, a pupil relay optical system is simple in arrangement or unnecessary. A laser scanning microscope includes a laser oscillator 6 and a wavefront converting element 5 for applying a desired wavefront conversion to a laser beam 15 emitted from the laser oscillator 6. An objective 7 collects a wavefront-converted approximately parallel laser beam 17 emerging from the wavefront converting element 5 onto a sample 9. A detector 29 detects signal light emitted from the sample 9. An actuator 8 scans the objective 7 along a direction perpendicular to the optical axis.

2 Claims, 18 Drawing Sheets

SCANNING OPTICAL MICROSCOPE

This is a divisional of U.S. patent application Ser. No. 10/025,973, filed on Dec. 26, 2001, now U.S. Pat. No. 6,751,016, the contents of which are incorporated herein in their entirety by reference.

This application claims benefit of Japanese Application No. 2000-394934 filed in Japan on Dec. 26, 2000, the contents of which are incorporated by this reference.

BACKGROUND OF THE INVENTION

1. Field of the Invention

The present invention relates to scanning optical microscopes and, more particularly, to a laser scanning microscope (LSM) that performs focal point movement along the direction of the optical axis by using a wavefront converting element.

2. Discussion of Related Art

It has heretofore been necessary in order to obtain a three-dimensional image of a specimen with an LSM, for example, to capture optical images of successive planes inside the specimen by mechanically moving either the specimen or the objective along the direction of the optical axis. With this method, however, it is difficult to realize positional control with high accuracy and high reproducibility because the method needs-mechanical drive. In a case where the specimen is moved, high-speed scanning cannot be effected when the specimen is large in size.

In observation of a biological specimen, if the objective is scanned in the state of being in direct contact with the specimen or immersed in a culture solution of the specimen, vibrations of the objective adversely affect the specimen under observation.

To solve the above-described problems, Japanese Patent Application Unexamined Publication (KOKAI) No. Hei 11-101942 discloses an adaptive optical apparatus. The apparatus is a microscope having an optical element (wavefront converting element) capable of changing power. The arrangement of the microscope is shown in FIGS. 27 and 28. In this prior art, a wavefront converting element is inserted in either or both of a viewing optical path and an illuminating optical path to change the focal length of the optical system and to correct aberration due to the change of the focal length by using the wavefront converting element. With this arrangement, it is possible not only to form and move a focal point in the object space without changing the distance between the objective and the specimen but also to correct aberration.

In the above-described prior art, it is preferable to place the wavefront converting element in the pupil plane of the objective or at a position conjugate to the pupil plane from the viewpoint of allowing the wavefront converting element to effectively perform its functions of moving the focal point in the object space and making aberration correction. If the wavefront converting element is not conjugate to the pupil plane, illuminating light or image-forming light will pass at different positions on the wavefront converting element according to the height of the object detected by the objective. To perform focal point movement or aberration correction, the wavefront shape has to be changed according to the object height. If the wavefront shape cannot properly be changed, image quality is likely to degrade considerably in an area where the object height is high.

If the wavefront converting element is changed into an optimum shape in accordance with a change in the object height, even if the wavefront converting element is not conjugate to the pupil plane, it is possible to avoid image quality degradation in an area where the object height is high. To realize this, however, the wavefront converting element needs to be controlled at high speed so as to provide an optimum rotationally asymmetric configuration. This is extremely difficult.

For the reasons stated above, it is desirable that the wavefront converting element should be placed at a position conjugate to the pupil. This is, however, difficult to implement because of the following problems.

A variety of objectives are used in microscopic observation, and the pupil position differs for each objective. Therefore, when a plurality of objectives are switched from one to another to perform observation, it is difficult to keep the pupils of the objectives in conjugate relation to the wavefront converting element at all times.

Further, the wavefront converting element needs to be placed in conjugate relation to the position of a laser scanning member and also to the position of the objective pupil. Accordingly, at least two pupil relay optical systems are required. Therefore, the apparatus becomes large in size and complicated unfavorably.

Further, in the above-described prior art, a reflection type wavefront converting element is incorporated in the illuminating optical path or/and the light-detecting optical path. Therefore, the prior art uses beam splitters as shown in FIGS. 27 and 28. Accordingly, when a non-polarized laser is used as a light source, together with a non-polarization type beam splitter, the amount of light is reduced to ¼ every time the laser beam travels via the wavefront converting element.

More specifically, the amount of light is reduced to ¼ in the process of illumination and also reduced to ¼ in the process of detection. That is, the amount of light is reduced to ¹⁄₁₆ in total. If a linearly polarized laser is used as a light source, together with a polarization beam splitter and a quarter-wave plate, the loss of light in the process of illumination can be prevented. However, in observation of fluorescence in a non-polarized state, the amount of light is reduced to ½ in the process of (fluorescence) detection.

Further, even when a polarization beam splitter and a quarter-wave plate are used as stated above, it is not always possible to use a linearly polarized laser as a light source. If a non-polarized laser is used to observe fluorescence, the amount of light is reduced to ½ in the process of illumination and also reduced to ½ in the process of detection. That is, the amount of light is reduced to ¼ in total.

SUMMARY OF THE INVENTION

The present invention was made to solve the above-described problems associated with the prior art. Objects of the present invention are as follows. A first object of the present invention is to provide a scanning optical microscope, e.g. a laser scanning microscope (LSM), using a wavefront converting element, wherein even when the object pupil and the wavefront converting element are not placed in conjugate relation to each other, off-axis performance degradation is minimized, and wherein the wavefront converting element can be controlled by an extremely simple method, and a pupil relay optical system is simple in arrangement or unnecessary. A second object of the present invention is to provide an LSM using a wavefront converting element, in which the loss of light can be prevented even when the wavefront converting element is of the reflection type.

To attain the above-described objects, the present invention provides a first scanning optical microscope including a light source and a wavefront converting element for applying a desired wavefront conversion to illuminating light emitted from the light source. An objective collects wavefront-converted illuminating light emerging from the wavefront converting element onto a sample. A detector detects signal light emitted from the sample. An actuator scans the objective along a direction perpendicular to the optical axis.

It is desirable that illuminating light emerging from the wavefront converting element should be an approximately parallel beam.

In addition, the present invention provides a second scanning optical microscope wherein when the above-described actuator scans one section of the sample perpendicular to the optical axis with the objective, the wavefront converting element applies a constant wavefront conversion to the illuminating light.

In addition, the present invention provides a third scanning optical microscope having an arrangement similar to that of the first or second scanning optical microscope, wherein when the amount of movement of the objective along the direction perpendicular to the optical axis (this will hereinafter be referred to as "scan range") is denoted by $\Delta X$, the following condition (1) is satisfied:

$$\Delta X \leq 0.66 f_{OB} \cdot \lambda/(\Delta Z \cdot NA^4) \quad (1)$$

where:
$f_{OB}$: the focal length of the objective;
$\Delta Z$: the amount of focal point movement caused by the wavefront converting element;
$\lambda$: the wavelength of the illuminating light;
NA: the numerical aperture of the objective.

In addition, the present invention provides a fourth scanning optical microscope including a light source and an optical element having a positive power for converting illuminating light emitted from the light source into a convergent beam. The fourth scanning optical microscope further includes a reflecting mirror with an aperture and a reflection type wavefront converting element for applying a desired wavefront conversion to the illuminating light. An objective collects the wavefront-converted illuminating light onto a sample. A detector detects signal light emitted from the sample.

In addition, the present invention provides a fifth scanning optical microscope wherein an optical system including the reflecting mirror with an aperture in the fourth scanning optical microscope satisfies the following condition (2):

$$r_{Hmin}/r_{Minc} \leq 0.5 \quad (2)$$

where:
$r_{Hmin}$: the minimum value of the length from the optical axis to the reflecting mirror edge;
$r_{Minc}$: the radius of wavefront-converted illuminating light incident on the reflecting mirror with an aperture.

In addition, the present invention provides a sixth scanning optical microscope including a light source and an optical element having a positive power for converting illuminating light emitted from the light source into a convergent beam. A reflecting mirror is placed at a position where the convergent beam is collected. A reflection type wavefront converting element applies a desired wavefront conversion to the illuminating light. An objective collects the wavefront-converted illuminating light onto a sample. A detector detects signal light emitted from the sample.

In addition, the present invention provides a seventh scanning optical microscope wherein an optical system including the reflecting mirror in the sixth scanning optical microscope satisfies the following condition (3):

$$r_{Mmin}/r_{Ainc} \leq 0.5 \quad (3)$$

where:
$r_{Mmin}$: the minimum value of the length from the optical axis to the reflecting mirror edge;
$r_{Ainc}$: the radius of wavefront-converted illuminating light at the position of the reflecting mirror.

In addition, the present invention provides an eighth scanning optical microscope including a light source and a reflection type wavefront converting element for applying a desired wavefront conversion to illuminating light emitted from the light source. An objective collects wavefront-converted illuminating light onto a sample. The light source also serves as a detector for detecting signal light emitted from the sample.

In addition, the present invention provides a ninth scanning optical microscope including a light source and a reflection type wavefront converting element for applying a desired wavefront conversion to illuminating light emitted from the light source. An objective collects wavefront-converted illuminating light emerging from the wavefront converting element onto a sample. A detector detects signal light emitted from the sample. The reflection type wavefront converting element is placed in an optical path so as to satisfy the following condition (4):

$$\theta_{PR} \leq 50 \cdot NA^{-1} \sqrt{(\lambda \cdot \Delta Z^{-1})} \quad (4)$$

where:
$\theta_{PR}$: the angle (°) of incidence of the principal ray on the wavefront converting element;
$\Delta Z$: the amount of focal point movement;
$\lambda$: the wavelength of the illuminating light;
NA: the numerical aperture of the objective.

In addition, the present invention provides a tenth scanning optical microscope including a light source and a reflection type wavefront converting element for applying a wavefront conversion to illuminating light emitted from the light source. An objective collects wavefront-converted illuminating light emerging from the wavefront converting element onto a sample. A detector detects signal light emitted from the sample. The reflecting surface of the reflection type wavefront converting element is controllable into an aspherical toric surface configuration.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
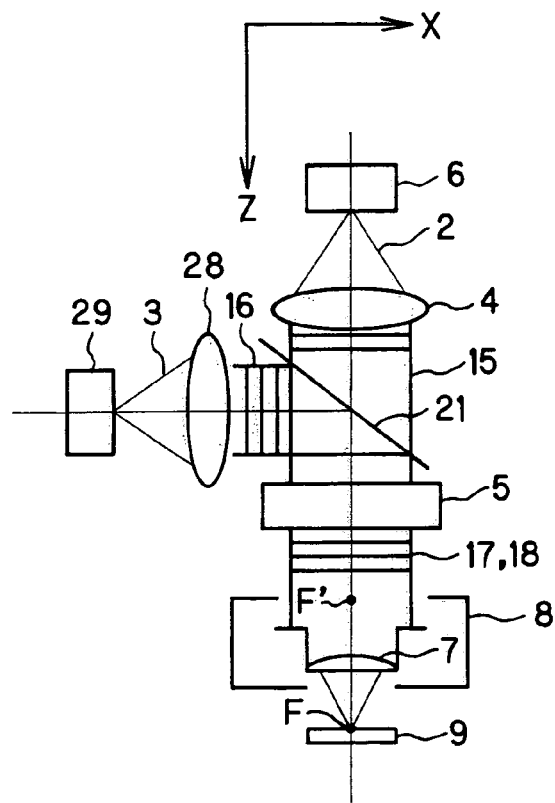
FIG. 1 is a diagram showing the arrangement of a laser scanning microscope according to the present invention wherein focal point movement is made by a wavefront converting element, and XY-scanning is performed by driving an objective.

The arrangement and operation of the scanning optical microscopes according to the present invention will be described below specifically with reference to the accompanying drawings. It should be noted that the same elements repeatedly employed in the drawings, which are used for the following description, are denoted by the same reference numerals, and a redundant description thereof is not given. Further, the present invention will be described as a laser scanning microscope (LSM) using a laser oscillator as a light source.

The basic arrangement of the first scanning optical microscope according to the present invention, together with wavefront aberration due to the movement of the object point during Z-scan (i.e. scan along the optical axis direction) and a variation of the arrangement, will be described below with reference to FIGS. 1 to 4.

An LSM can be realized by an arrangement as shown in FIG. 1. In FIG. 1, a laser light source 6 emits illuminating light 2. The illuminating light 2 is converted into a plane wave through a collimation lens 4. The plane wave passes through a beam splitter 21 and enters a wavefront converting element 5 as pre-correction illuminating light 15. In the wavefront converting element 5, the pre-correction illuminating light 15 is subjected to a predetermined wavefront conversion (described later) and exits therefrom as post-correction illuminating light 17, which is then converted into a spherical wave through an objective 7 to illuminate a point on a sample 9. Reflected light from the sample 9 is collected through the objective 7 and enters the wavefront converting element 5 as pre-correction viewing light 18. In the wavefront converting element 5, the pre-correction viewing light 18 is subjected to a predetermined wavefront conversion and exits therefrom as post-correction viewing light 16, which is a plane wave. The post-correction viewing light 16 is reflected by the beam splitter 21 and collected through a convex lens 28 to enter a photodetector 29 as viewing light 3.

The objective 7 is of the infinity corrected type, in which aberration is minimized when the object plane is coincident with the object-side focal point F thereof. An objective actuator 8 scans the objective 7 along the XY-directions.

Figure 2A:
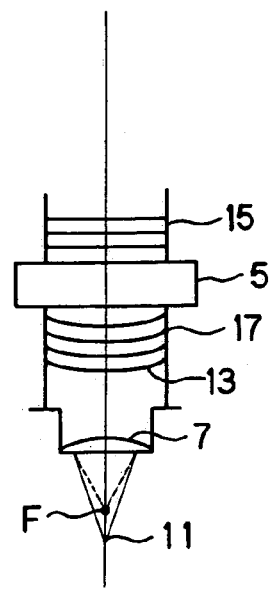
FIGS. 2(a) and 2(b) are diagrams for describing the plus-side movement and minus-side movement of a focal point caused by the wavefront converting element.
Figure 2B:
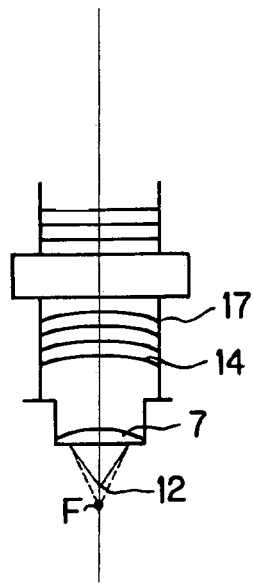

The wavefront converting element 5 is capable of converting the wavefront of illuminating light. Therefore, as shown in FIG. 2(a), the post-correction illuminating light 17 can be formed into a divergent beam wavefront 13 so that the position where the illuminating light is collected shifts to a plus-side shifted focal point 11, which is more away from the objective 7 than the object-side focal point F. Conversely, as shown in FIG. 2(b), the post-correction illuminating light 17 can also be formed into a convergent beam wavefront 14 so that the position where the illuminating light is collected shifts to a minus-side shifted focal point 12, which is closer to the objective 7 than the object-side focal point F. That is, the position where the illuminating light is collected can be moved without moving the objective 7 or the sample 9.

Figure 3:
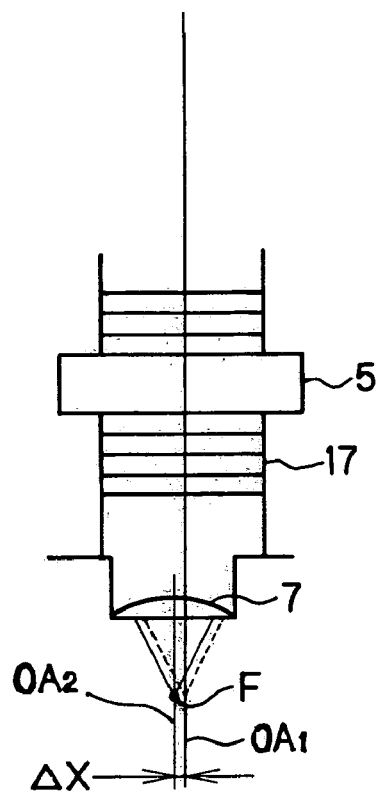
FIG. 3 is a diagram for describing XY-scanning with the objective.

Further, because the objective 7 is scanned along the XY-directions by the objective actuator 8, the object-side focal point F can be moved along the XY-directions, as shown in FIG. 3. In the figure, $OA_1$ denotes the optical axis of the wavefront converting element 5, and $OA_2$ denotes the optical axis of the objective 7. Scan range $\Delta X$ is the distance between $OA_1$ and $OA_2$.

In other words, this system functions as a laser scanning microscope in which a position where a laser beam is collected is spatially moved to illuminate the sample 9, and light from the sample 9 is detected as viewing light.

Let us explain the operation of the wavefront converting element 5 to move the focal position as shown in FIGS. 2(a) and 2(b).

Because the objective 7 is of the infinity corrected type, when the illuminating light source is at a finite distance, the focal position is displaced from the object-side focal point F. In addition, spherical aberration increases. Accordingly, in order to effect favorable image formation at the plus-side shifted focal point 11 and the minus-side shifted focal point 12, it is desirable that the divergent beam wavefront 13 and the convergent beam wavefront 14, which are incident on the objective 7, should have not only a component for moving the paraxial focal point but also a component for correcting spherical aberration due to the movement of the paraxial focal point.

Figure 4:
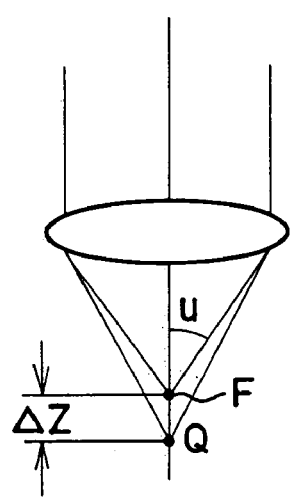
FIG. 4 is a diagram for describing wavefront aberration due to the movement of the focal point.

Let us explain the spherical aberration correcting component with reference to FIG. 4. When rays with an inclination angle u are collected at a point Q on the optical axis in the vicinity of the object-side focal point F of the objective 7, i.e. a distance $\Delta Z$ away from the object-side focal point F, wavefront aberration W with respect to the object-side focal point F is expressed by the following equation (5):

$$W = W_F + W_{SA} \quad (5)$$

where:

$W_F = -2\Delta Z \sin^2(u/2)$ $W_{SA} = -2\Delta Z \sin^4(u/2)$

In the above expression, $W_F$ is wavefront aberration due to the focal point shift, and $W_{SA}$ is spherical aberration in terms of wavefront aberration that occurs owing to the focal point shift. The wavefront aberrations $W_F$ and $W_{SA}$ are derived from the Herschel condition. That is, in order to obtain an image corrected for spherical aberration at the plus-side shifted focal point 11 or the minus-side shifted focal point 12, shown in FIGS. 2(a) and 2(b), a wavefront conversion corresponding to the wavefront aberration W expressed by the above equation (5) should be applied to the pre-correction illuminating light 15 by the wavefront converting element 5.

Next, a variation of the arrangement shown in FIG. 1 will be described. In FIG. 1, two different elements are used as a laser light source and a light-detecting device, respectively. However, it is also possible to endow a single element with both the function of a light source and the function of a light-detecting device. That is, a semiconductor laser chip as used as a light source can also function as a photodetector. Accordingly, if a semiconductor laser chip is used, the beam splitter 21 becomes unnecessary, and a laser feedback microscope is constructed. If a gas laser is used as a light source, because it emits a narrow parallel beam, a beam expander should be used in place of the collimation lens 4.

As the wavefront converting element 5, it is possible to use a transmission type wavefront converting element using a liquid crystal cell or the like. Alternatively, a reflection type wavefront converting element such as a membrane mirror may be used. Further, although in the foregoing arrangement the pre-correction illuminating light 15 entering the wavefront converting element 5 is a parallel beam, it may be a divergent beam or a convergent beam.

Further, the light-detecting optical path need not always be arranged to overlap the illuminating optical path. The light-detecting optical path may be provided at the back of the sample 9 to detect transmitted light. Alternatively, the light-detecting optical path may be disposed at a side of the sample 9 to detect scattered light. In particular, when a pulse laser is used as the light source 6 to observe the sample 9 with fluorescence produced by two-photon excitation, it is possible to obtain satisfactory resolution in the optical axis direction even with a non-confocal optical system owing to non-linear characteristics inherent in two-photon fluorescence. In such a case, it is desirable to position the photodetector closer to the sample than the illuminating optical path with a view to improving the light detection efficiency as well.

The second scanning optical microscope according to the present invention will be described below with reference to FIG. 5. The fact that the wavefront is kept constant during XY-scan will be explained with regard to a case where the pupil and the wavefront converting element are in conjugate positional relation to each other and also regarding a case where the pupil is not in conjugate relation to the wavefront converting element.

First, the influence of the scanning of the objective 7 on the image will be described. The objective 7 is scanned along the XY-directions by the objective actuator 8. The amount of wavefront conversion applied by the wavefront converting element 5 during the scanning is as expressed by the above-described equation (5). In the scanning optical microscope according to the present invention, the amount of wavefront conversion applied by the wavefront converting element 5 is kept constant independently of the values of X and Y.

Because the objective 7 is of the infinity corrected type, if the post-correction illuminating light 17 is a plane wave as shown in FIG. 3, the image-forming characteristics will not degrade even when the objective 7 is scanned along the XY-directions. However, if scanning along the XY-directions is performed after the focal point movement has been made as shown in FIG. 2(a) or 2(b), the image-forming characteristics degrade. FIG. 5 shows a state where X-direction scanning has been performed by $\Delta X$ in FIG. 2(b). In the figure, reference numeral 39 denotes an ideal wavefront. Reference numeral 14 denotes the above-described convergent beam wavefront. When $\Delta X = 0$, the convergent beam wavefront 14 and the ideal wavefront 39 are coincident with each other. When $\Delta X \neq 0$, however, a wavefront displacement shown by ΔW in the figure occurs. The wavefront displacement is nothing but the wavefront aberration with respect to the point Q where light is collected. The wavefront aberration ΔW has an influence upon image-forming performance but gives rise to no problem in practical application as long as it is within a predetermined range, i.e. provided that the Strehl ratio is 70% or more.

Tables 1 to 3 below show the results of simulation performed to examine changes in the image-forming characteristics under various conditions when the focal point movement and the scanning of the objective along the XY-directions were performed simultaneously as stated above.

Table 1 shows the results of simulation in which the system was arranged so that the wavefront converting element and the pupil of the objective were conjugate to each other, and an optimum wavefront conversion W for obtaining ΔZ=0.05 (mm) was applied. Scan range ΔX within which the Strehl ratio was 70% or more was obtained for the following wavelengths of light and NA values: 830 nm, 546.7 nm, and 248 nm; and NA 0.5 to 0.9. It should be noted that the objective used was an ideal objective having a focal length $f_{OB}=3$ (mm).

Similarly, Table 2 shows the results of simulation in which $f_{OB}=10$ (mm), and ΔZ=0.05 (mm), and Table 3 shows the results of simulation in which $f_{OB}=20$ (mm), ΔZ=0.15 (mm), and NA was 0.5 to 0.7.

TABLE 1

[$f_{OB}$ = 3 (mm), ΔZ = 0.05 (mm), pupil conjugate]

| Wavelength (nm) | NA | ΔX (STR = 70%) |
|---|---|---|
| 830 | 0.5 | 0.432 |
| | 0.6 | 0.255 |
| | 0.7 | 0.144 |
| | 0.8 | 0.080 |
| | 0.9 | 0.040 |
| 546.07 | 0.5 | 0.314 |
| | 0.6 | 0.176 |
| | 0.7 | 0.099 |
| | 0.8 | 0.051 |
| | 0.9 | 0.026 |
| 248 | 0.5 | 0.158 |
| | 0.6 | 0.083 |
| | 0.7 | 0.043 |
| | 0.8 | 0.023 |
| | 0.9 | 0.011 |

TABLE 2

[$f_{OB}$ = 10 (mm), ΔZ = 0.05 (mm), pupil conjugate]

| Wavelength (nm) | NA | ΔX (STR = 70%) |
|---|---|---|
| 830 | 0.5 | 1.348 |
| | 0.6 | 0.815 |
| | 0.7 | 0.451 |
| | 0.8 | 0.243 |
| | 0.9 | 0.113 |
| 546.07 | 0.5 | 0.988 |
| | 0.6 | 0.558 |
| | 0.7 | 0.300 |
| | 0.8 | 0.151 |
| | 0.9 | 0.073 |
| 248 | 0.5 | 0.507 |
| | 0.6 | 0.258 |
| | 0.7 | 0.131 |
| | 0.8 | 0.069 |
| | 0.9 | 0.033 |

TABLE 3

[$f_{OB}$ = 20 (mm), ΔZ = 0.15 (mm), pupil conjugate]

| Wavelength (nm) | NA | ΔX (STR = 70%) |
|---|---|---|
| 830 | 0.5 | 1.113 |
| | 0.6 | 0.587 |
| | 0.7 | 0.309 |
| 546.07 | 0.5 | 0.737 |
| | 0.6 | 0.393 |
| | 0.7 | 0.200 |
| 248 | 0.5 | 0.346 |
| | 0.6 | 0.172 |
| | 0.7 | 0.091 |

Let us take notice of the results for the wavelength 546.07 nm and NA 0.7, for example, in Tables 1 to 3. In Table 1, ΔX=0.099 (mm). In Table 2, ΔX=0.300 (mm). In Table 3, ΔX=0.200 (mm). It can be said that the wavefront aberration ΔW is sufficiently small in the above scan range ΔX. Therefore, if XY-scanning is performed within these ranges, the wavefront need not be changed in accordance with the scanning. In other words, favorable image-forming performance can be obtained with the wavefront kept constant. These hold true of the other wavelengths and NA values.

Figure 5:
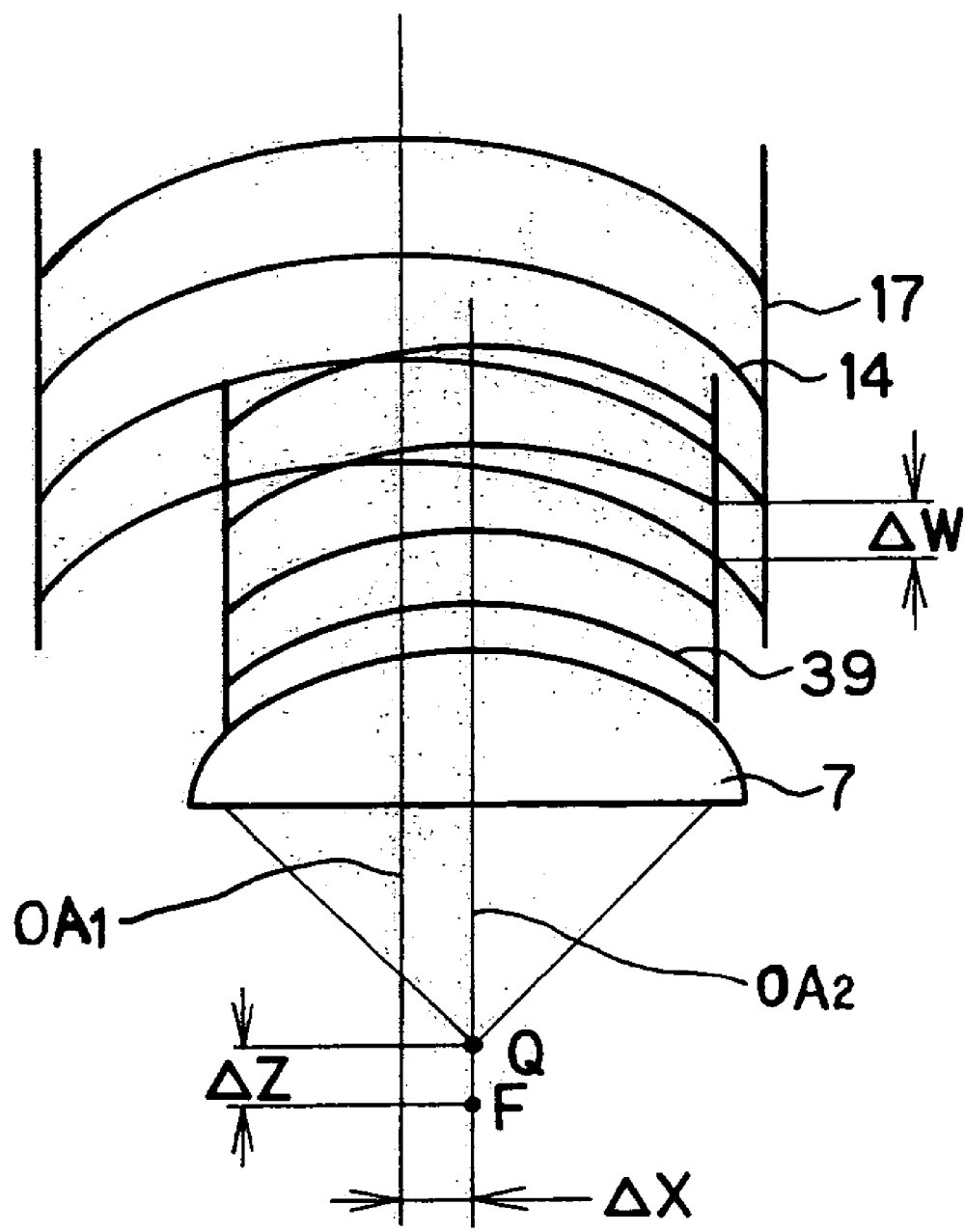
FIG. 5 is a diagram for describing wavefront aberration due to scanning with the objective.

It should be noted that, in FIG. 5, $OA_2$ is located on the right-hand side of $OA_1$. However, if the absolute value of ΔX is the same, the image-forming characteristics of the optical system are the same regardless of whether $OA_2$ is on the right-hand side of $OA_1$ or on the left-hand side thereof. The same shall apply in the following optical systems, unless otherwise specified.

The above Tables 1 to 3 show the results of simulation in which the system was arranged so that the pupil of the objective and the wavefront converting element were conjugate to each other. The following is a description of a case where the objective pupil and the wavefront converting element are not in conjugate positional relation to each other.

Table 4 below shows the way in which image-forming characteristics change as the conjugate relationship between the objective pupil and the wavefront converting element is gradually destroyed. The objective used was an ideal objective having a focal length $f_{OB}=10$ (mm) and NA 0.7. Strehl ratios for ΔX=0 to 0.3 (mm) when the distance between the objective pupil and the wavefront converting element was changed from 0 to 300 mm were obtained (wavelength: 546.07 nm).

TABLE 4

[$f_{OB}$ = 10 (mm), NA = 0.7, wavelength 546.07 nm]

| ΔZ (mm) | Pupil | Distance between objective and wavefront converting element (mm) | ΔX (mm) | | | |
|---|---|---|---|---|---|---|
| | | | 0 | 0.1 | 0.2 | 0.3 |
| 0.05 | Conjugate | 0 | (STR=)1 | 0.96 | 0.86 | 0.701 |
| | Non-conjugate | 10 | 1 | 0.96 | 0.96 | 0.701 |
| | | 30 | 1 | 0.96 | 0.86 | 0.701 |
| | | 100 | 1 | 0.96 | 0.865 | 0.702 |
| | | 125 | 0.991 | 0.953 | 0.86 | 0.701 |
| | | 150 | 0.979 | 0.94 | 0.841 | 0.681 |
| | | 200 | 0.815 | 0.792 | 0.75 | 0.632 |
| -0.05 | Conjugate | 0 | 1 | 0.956 | 0.845 | 0.671 |
| | Non- | 10 | 1 | 0.955 | 0.842 | 0.668 |

TABLE 4-continued

[$f_{OB}$ = 10 (mm), NA = 0.7, wavelength 546.07 nm]

| ΔZ (mm) | Distance between objective and wavefront converting element (mm) | ΔX (mm) | | | |
|---|---|---|---|---|---|
| | | 0 | 0.1 | 0.2 | 0.3 |
| Pupil conjugate | 30 | 1 | 0.955 | 0.842 | 0.667 |
| | 100 | 1 | 0.955 | 0.842 | 0.667 |
| | 125 | 1 | 0.955 | 0.842 | 0.667 |
| | 150 | 1 | 0.955 | 0.839 | 0.667 |
| | 200 | 1 | 0.955 | 0.84 | 0.658 |
| | 300 | 1 | 0.955 | 0.838 | 0.658 |

The results shown in Table 4 reveal that the system of the present invention suffers minimum off-axis image degradation even when the pupil of the objective and the wavefront converting element are not in conjugate positional relation to each other. That is, when the scan range is ΔX=0.2 (mm), for example, even if the pupil is 200 mm away from the wavefront converting element, a Strehl ratio of 0.75 or more can be obtained.

As has been stated above, the system of the present invention is characterized in that when the objective is scanned along a direction perpendicular to the optical axis, i.e. the X-direction, the wavefront conversion applied by the wavefront converting element is kept constant. It is, however, a matter of course that the system of the present invention is also applicable to two-dimensional scan in the X-Y plane.

Regarding the third scanning optical microscope according to the present invention, the scan range of the objective will be described below with reference to FIGS. 6 and 7.

As has been stated above, the XY-scanning of the objective has an influence on the image-forming characteristics. However, as long as it is within a predetermined range, the influence does not matter in practical application, and satisfactory image-forming performance is obtained. That is, although it depends on various conditions, the scan range ΔX where the Strehl ratio is 0.7 or more can be obtained according to the following expression:

$$\Delta X \leq 0.66 f_{OB} \cdot \lambda / (\Delta Z \cdot NA^4) \quad (1)$$

where:
$f_{OB}$: the focal length of the objective;
ΔZ: the amount of focal point movement caused by the wavefront converting element;
λ: the wavelength of the illuminating light;
NA: the numerical aperture of the objective.

Figure 6:
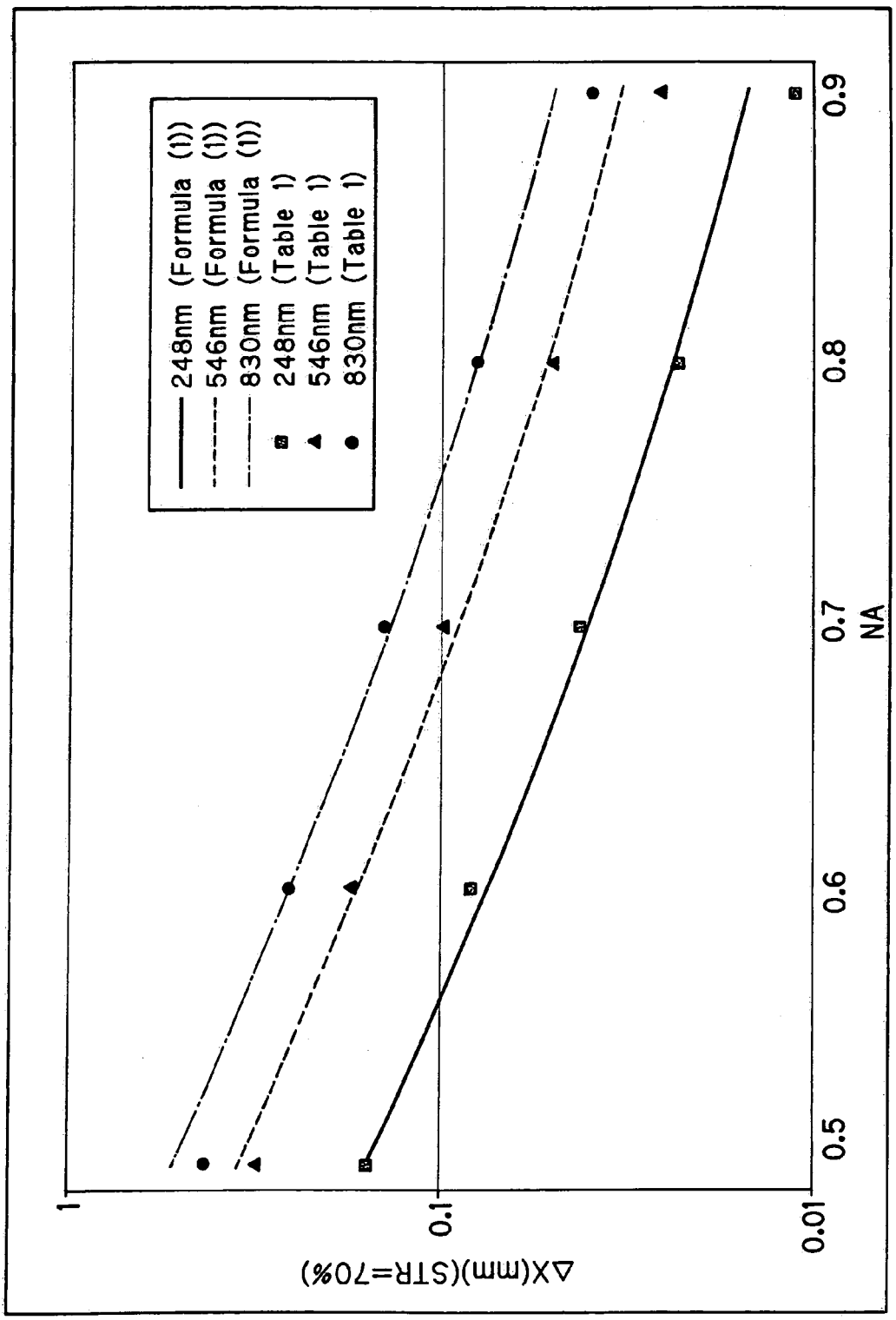
FIG. 6 is a graph showing the results of simulation for obtaining a scan range ΔX [when $f_{OB}$=3 (mm)] where the Strehl ratio is 0.7 or more, together with the curves of formula (1).
Figure 7:
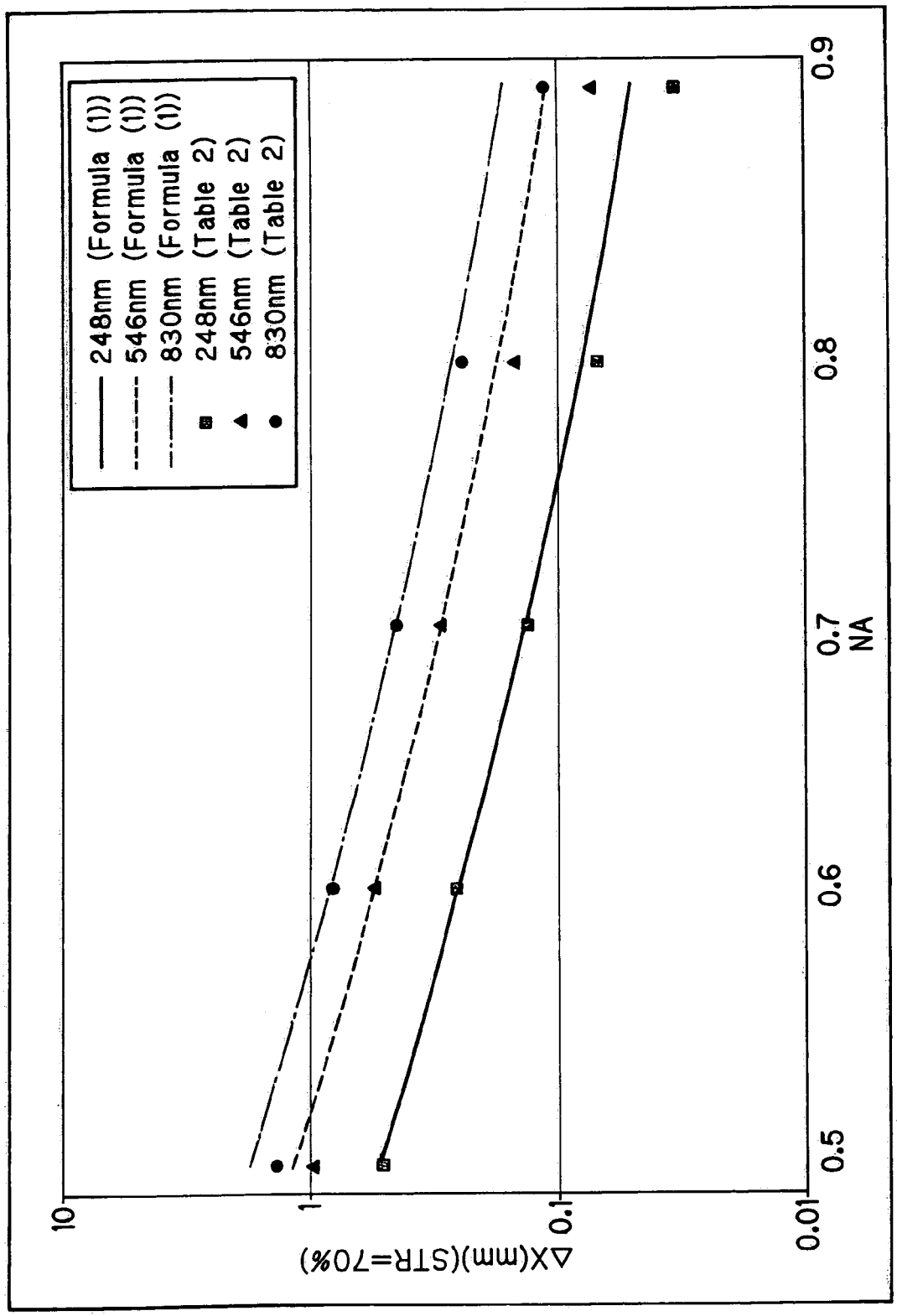
FIG. 7 is a graph showing the results of simulation for obtaining a scan range ΔX [when $f_{OB}$=10 (mm)] where the Strehl ratio is 0.7 or more, together with the curves of formula (1).

The results shown in Tables 1 and 2 above are shown in FIGS. 6 and 7, respectively, together with the curves of the above formula (1). It will be understood from FIGS. 6 and 7 that the curves of formula (1) agree with the results shown in Tables 1 and 2. That is, in the present invention, the scan range ΔX of the objective is controlled so as to satisfy the condition (1). Thus, favorable image-forming performance can be obtained with the wavefront kept constant.

The fourth and fifth scanning optical microscopes according to the present invention will be described below with regard to a reflecting mirror with an aperture.

Regarding the fourth scanning optical microscope according to the present invention, a basic arrangement for minimizing the loss of light, together with a variation thereof, will be described below with reference to FIGS. 8 and 9.

Figure 8:
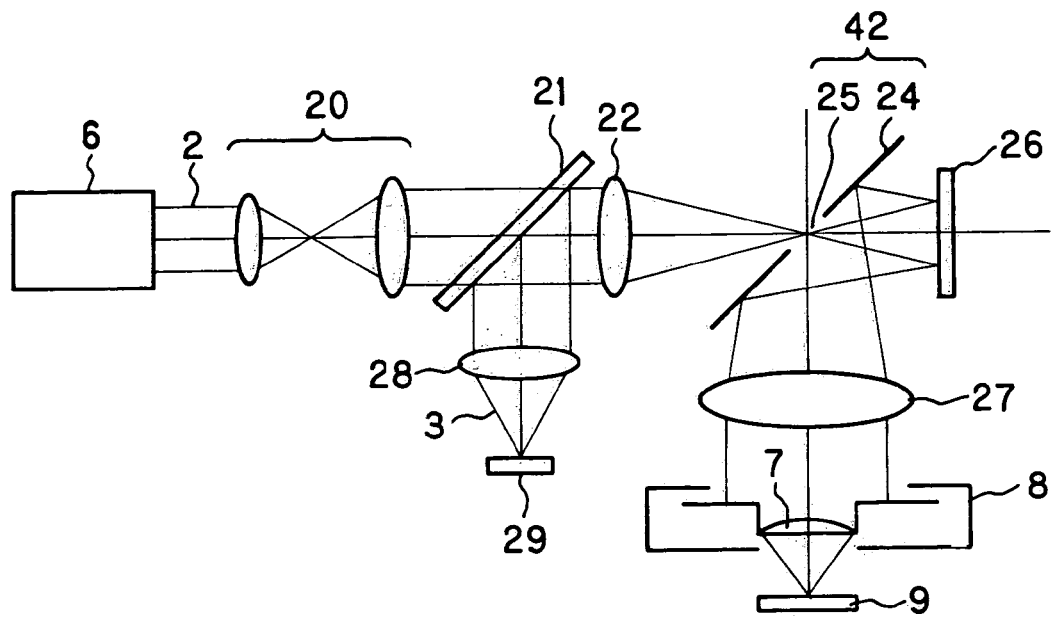
FIG. 8 is a diagram showing the arrangement of an embodiment of a laser scanning microscope having a reflection type wavefront converting element and a reflecting mirror with an aperture.

An LSM in which focal point movement is made by a wavefront converting element, and the loss of light is extremely small and hence a bright image can be obtained can be realized by the arrangement shown in FIG. 8. In the illustrated arrangement, a laser light source 6 emits illuminating light 2. The illuminating light 2 is magnified through a beam expander 20. The magnified illuminating light 2 passes through a beam splitter 21 and is collected through a convex lens 22. The collected light is incident on a reflecting mirror 42 having a reflecting surface 24 and an aperture 25 (the reflecting mirror 42 will hereinafter be referred to as "apertured reflecting mirror"). The incident light passes through the aperture 25 and is incident on a reflection type wavefront converting element 26. The illuminating light is subjected to wavefront conversion when reflected by the reflection type wavefront converting element 26. The wavefront-converted illuminating light is reflected by the reflecting surface 24 and formed into an approximately parallel beam through a collimation lens 27. Then, the illuminating light is collected on a sample 9 through an objective 7. Viewing light from the sample 9 travels along a path reverse to the above and is reflected by the beam splitter 21 and collected on a photodetector 29 through a convex lens 28.

The scanning optical microscope shown in FIG. 8 is similar to the arrangement shown in FIG. 1 in that the movement of the focal point and the correction of spherical aberration due to the focal point movement are made by the reflection type wavefront converting element 26, and the XY-scanning of the objective 7 is performed by the objective actuator 8.

Figure 27:
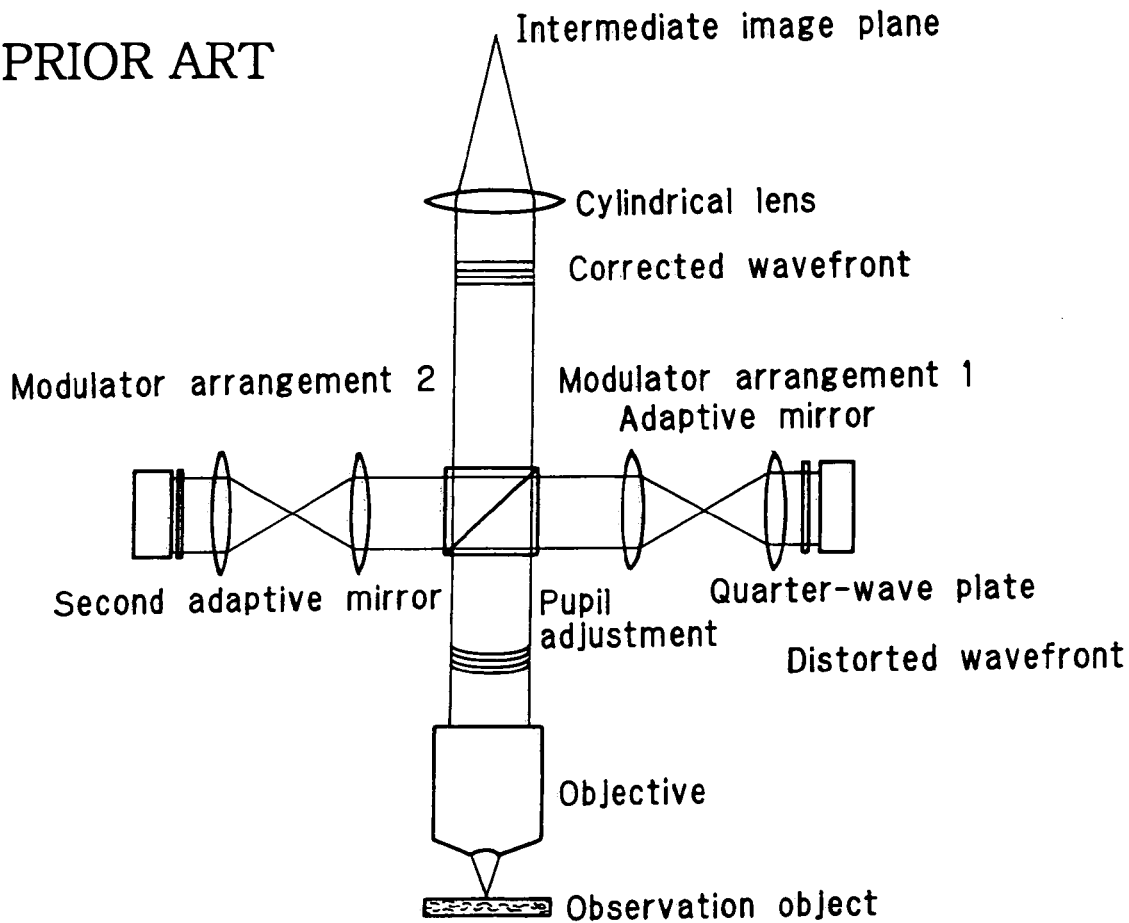
FIG. 27 is a diagram showing the arrangement of a conventional microscope in which a beam splitter is used for optical path splitting.
Figure 28:
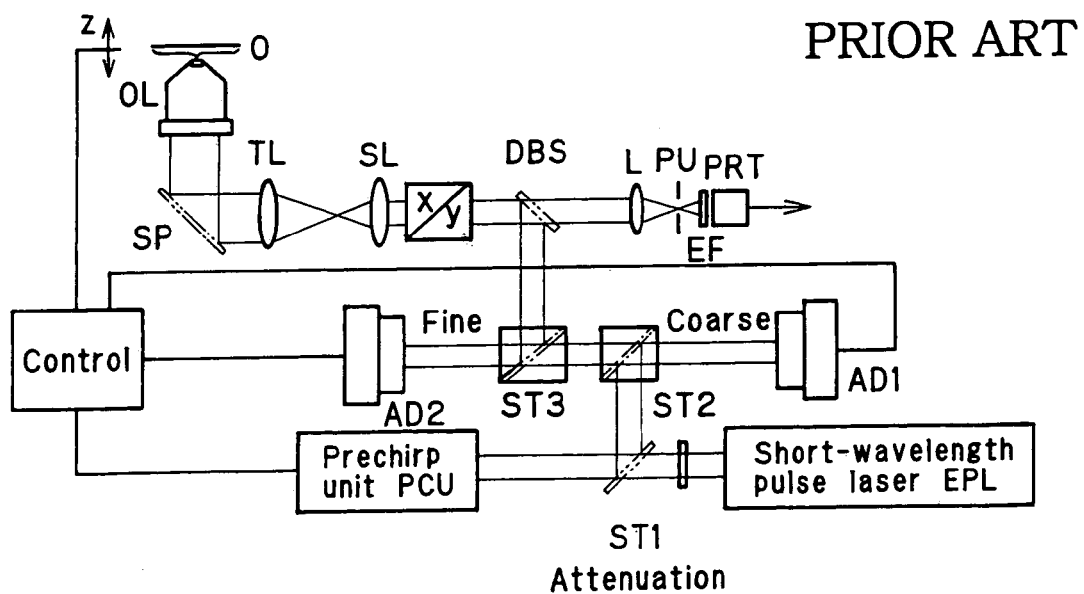
FIG. 28 is a diagram showing the arrangement of a conventional two-photon microscope in which beam splitters are used for optical path splitting.

The fourth scanning optical microscope uses the apertured reflecting mirror 42 as a device for leading illuminating light to the reflection type wavefront converting element 26. Accordingly, unlike the prior art using a beam splitter as shown in FIGS. 27 and 28, this scanning optical microscope can reduce the loss of light to an extremely small quantity. Further, because a narrowed beam passes through the aperture 25, a confocal effect can be obtained by appropriately setting the size of the aperture 25. The confocal effect is particularly useful for observation of a fluorescent sample. To perform fluorescence observation, it is desirable to use a dichroic mirror having appropriate wavelength characteristics in place of the beam splitter 21.

Figure 9:
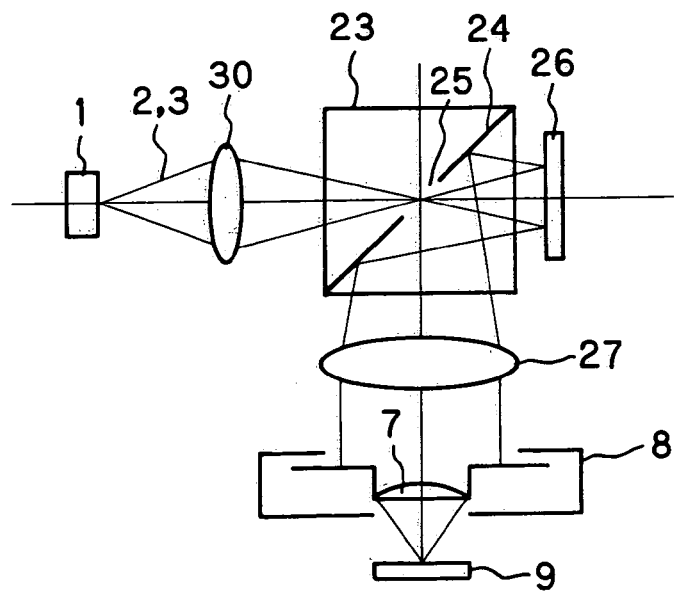
FIG. 9 is a diagram showing the arrangement of another embodiment of the laser scanning microscope having a reflection type wavefront converting element and a reflecting mirror with an aperture.

FIG. 9 shows the arrangement of another embodiment of the scanning optical microscope using an apertured reflecting mirror. In this embodiment, an apertured reflecting prism 23 comprising two rectangular prism members and a reflecting surface is used as an apertured reflecting mirror. The apertured reflecting prism 23 has a reflecting surface 24 at a cemented surface between the two prism members. An aperture 25 is provided in a part of the reflecting surface 24. Further, a semiconductor laser chip 1 is used as a light source also serving as a photodetector to construct a laser feedback microscope.

Illuminating light 2 is collected in the aperture 25 through only a convex lens 30 without using a beam expander. The arrangement of the rest of the system is the same as that shown in FIG. 8. The arrangement shown in FIG. 9 is similar to that shown in FIG. 8 in that the movement of the focal point and the correction of spherical aberration due to the focal point movement are made by the reflection type wavefront converting element 26, and the XY-scanning of the objective 7 is performed by the objective actuator 8, and also in terms of the action and effect of the apertured reflecting prism 23 to reduce the loss of light.

It should be noted that an apertured reflecting mirror is also applicable to a beam scan type LSM, although it involves problems such as a change in the objective pupil position due to switching between objectives and an increase in the overall size of the system due to the presence of a pupil relay optical system. The application of an apertured reflecting mirror to a beam scan type LSM will be shown below.

Figure 10:
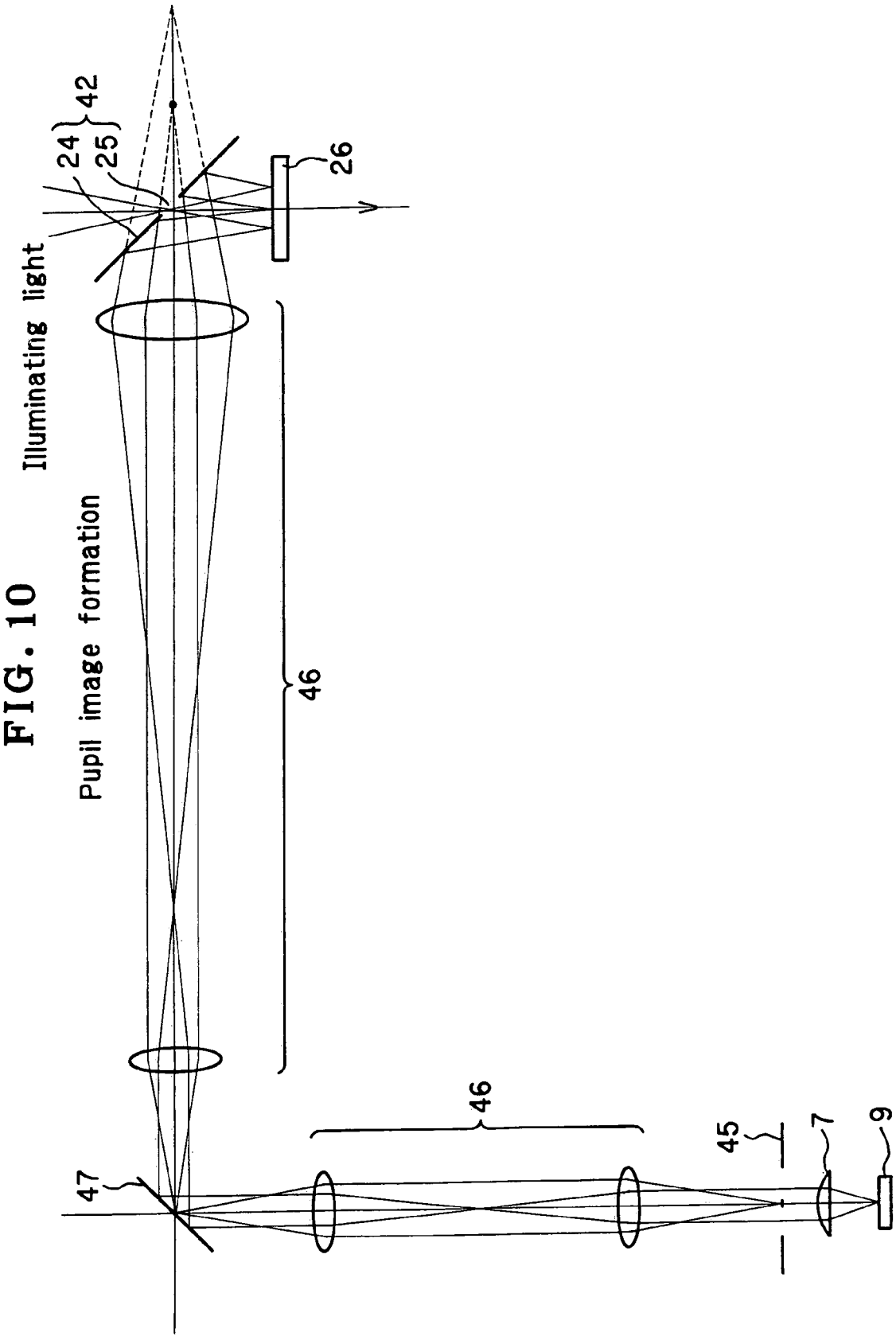
FIG. 10 is a diagram showing the arrangement of an embodiment of a laser scanning microscope having a galvanometer mirror, a reflection type wavefront converting element and a reflecting mirror with an aperture.

FIG. 10 shows the arrangement of another embodiment of the scanning optical microscope using an apertured reflecting mirror. In this embodiment, a galvanometer mirror 47 is used as a scanning device, and two pupil relay optical systems 46 are arranged to place the objective pupil 45, the galvanometer mirror 47 and the reflection type wavefront converting element 26 in conjugate relation to each other. The portion of this embodiment that is not illustrated in the figure is the same as that of the arrangement shown in FIG. 8.

The apertured reflecting mirror 42 is extremely effective in reducing the loss of light when focal point movement is effected by a reflection type wavefront converting element not only in the objective scanning type LSM shown in FIGS. 8 and 9 but also in the beam scan type LSM using a galvanometer mirror or the like, which is shown in FIG. 10. As a device for beam scan, a polygon mirror or an AOM (acoustic-optical modulator) may also be used besides a galvanometer mirror.

Figure 11:
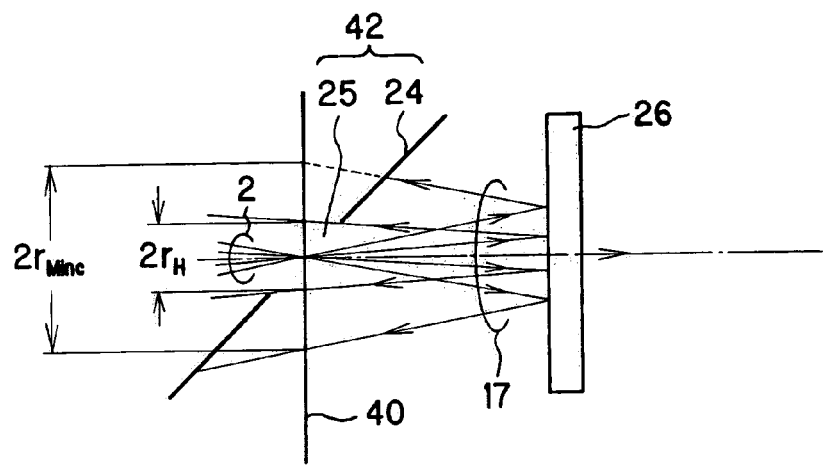
FIG. 11 is a diagram for describing the loss of light at the reflecting mirror with an aperture shown in FIG. 10.

Next, the fifth scanning optical microscope according to the present invention will be described with reference to FIGS. 11 to 13. The arrangement of the fifth scanning optical microscope is the same as that shown in FIGS. 8 and 9. The following is a description of the aperture 25.

How the apertured reflecting mirror shown in FIGS. 8 and 9 can efficiently lead illuminating light to the wavefront converting element will be described below with reference to FIGS. 11, 12(a) and 13 in combination with FIGS. 8 and 9.

In FIGS. 8 and 9, the illuminating light 2 is collected through the lens 22 or 30 when incident on the apertured reflecting mirror 42 or the apertured reflecting prism 23. The apertured reflecting mirror 42 or the apertured reflecting prism 23 is positioned so that the position where the illuminating light 2 is collected and the aperture 25 are coincident with each other. With this arrangement, the illuminating light 2 passes through the aperture 25. Therefore, there is substantially no loss of light when the illuminating light 2 passes through the aperture 25. After passing through the aperture 25, the illuminating light 2 becomes a divergent beam. The divergent beam is reflected by the reflection type wavefront converting element 26 to become a post-correction illuminating light 17. After further diverging, the post-correction illuminating light 17 is reflected by the reflecting surface 24. At this time, a part of the illuminating light passes through the aperture 25 instead of being reflected. Therefore, there is a loss of light at the aperture 25. This is shown in FIG. 11. The amount of light lost at the aperture 25 can be evaluated at a plane 40 parallel to the reflection type wavefront converting element 26. Let us assume that the radius of an outline defined by the outer periphery of the beam of post-correction illuminating light 17 when intersecting the plane 40 is $r_{Minc}$, and the radius of an outline of the post-correction illuminating light 17 passing through the aperture 25 that is defined on the plane 40 when the post-correction illuminating light 17 intersects the plane 40 is $r_H$. On this assumption, the amount of light in the range of the radius $r_H$ is the loss of the post-correction illuminating light 17. If it is assumed that illuminating light in the range extending from the radius $r_H$ to the beam radius $r_{Minc}$ is all (100%) reflected by the reflecting surface 24, the reflectance $\eta_H$ is calculated as follows.

Figure 13:
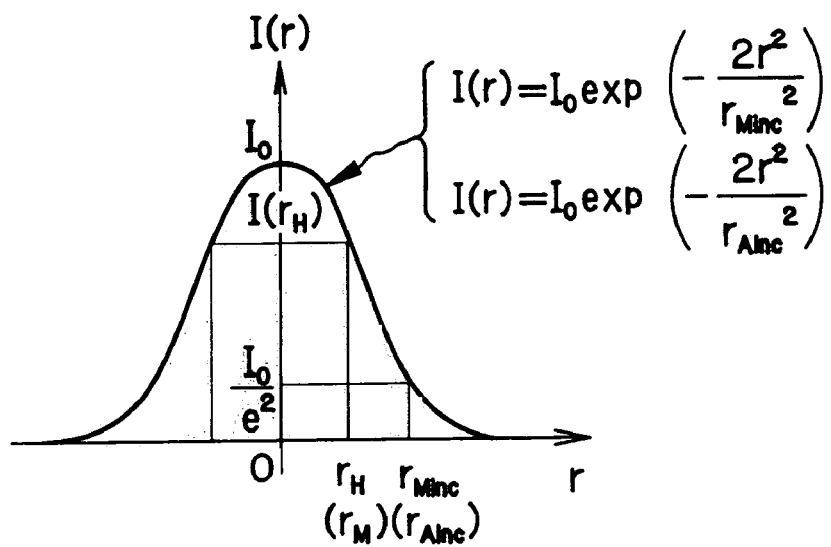
FIG. 13 is a diagram showing the intensity distribution of a Gaussian beam.

Assuming that the post-correction illuminating light 17 is a Gaussian beam with a beam radius $r_{Minc}$ as shown in FIG. 13, the intensity distribution I(r) thereof is expressed by $$I(r)=I_0 \cdot \exp(-2r^2/r_{Minc}^2) \qquad (6)$$

From equation (6), the integral E(r) of the intensity within the radius r is expressed by $$E(r) = 2\pi \int_0^r I(r) \cdot r \, dr \qquad (7)$$
$$= 0.5 I_0 \cdot r_{Minc}^2 \cdot \pi \{1 - \exp(-2r^2/r_{Minc}^2)\}$$

As has been stated above, a part of the post-correction illuminating light 17 that falls within the range of the radius $r_H$ is lost. Therefore, with respect to the total amount of light within the range of the beam radius $r_{Minc}$, the reflectance $\eta_H$, i.e. efficiency, is expressed on the basis of equation (7) as follows:

$$\eta_H = \{E(r_{Minc}) - E(r_H)\}/E(r_{Minc}) \qquad (8)$$
$$= \{\exp(2 - 2r_H^2/r_{Minc}^2) - 1\}/\{\exp(2) - 1\}$$

It will be understood from the above equation (8) that $\eta_H$ is determined by the ratio of $r_H$ to $r_{Minc}$.

The relationship between $(r_H/r_{Minc})$ and $\eta_H$ is shown in Table 5 below.

TABLE 5

(reflectance at apertured reflecting mirror)

| | $r_H/r_{Minc}$ | | | | | | | | |
|---|---|---|---|---|---|---|---|---|---|
| | 0.1 | 0.2 | 0.3 | 0.4 | 0.5 | 0.6 | 0.7 | 0.8 | 0.9 |
| $\eta_H$ | 0.977099 | 0.911083 | 0.809487 | 0.683287 | 0.544946 | 0.406420 | 0.277536 | 0.165037 | 0.072356 |

As will be understood from Table 5, if $(r_H/r_{Minc}) \leq 0.5$, $\eta_H \leq 0.54$. It will also be understood that as $(r_H/r_{Minc})$ decreases, $\eta_H$ increases, and when $(r_H/r_{Minc})=0.1$, $\eta_H$ reaches 0.977. Thus, the reflectance is extremely high. That is, the loss of light is favorably small.

In the case of the prior art using a beam splitter, even when a polarization beam splitter, which produces a relatively small loss of light, is used, if light from the light source is random polarized, at least a half-of the random polarized light is lost when it is converted into linearly polarized light. In contrast, the present invention can provide $\eta_H \leq 0.54$ by arranging the optical system so that $(r_H/r_{Minc}) \leq 0.5$ regardless of whether light is polarized or non-polarized. Consequently, the illuminating light can be led to the wavefront converting element more efficiently than in the case of the prior art using a beam splitter.

Figures 12A, 12B, 12C:
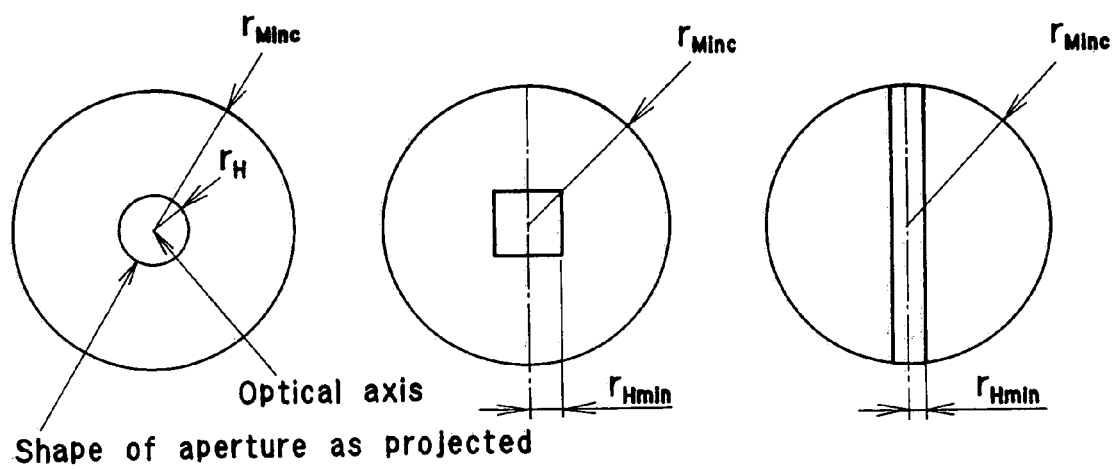
FIGS. 12(a), 12(b) and 12(c) are diagrams each showing the beam diameter at a reflecting mirror with an aperture and the shape of the aperture as projected.

Although in the foregoing the shape of the aperture 25 in FIG. 12(a) has been described as a circle having a radius $r_H$, the shape of the aperture for producing the above-described effect of minimizing the loss of light is not necessarily limited to the circular shape. For example, the aperture shape may be elliptical, polygonal, a star-shape, a slit-like shape, or an irregular shape. Even if the aperture has such a shape, the illuminating light can be efficiently led to the wavefront converting element as long as the optical axis extends through the aperture. When the aperture shape is not circular, the minimum value $r_{Hmin}$ of the length from the reflecting mirror edge (the boundary between the reflecting surface and the aperture) to the optical axis should be regarded as $r_H$. This is shown in FIGS. 12(b) and 12(c).

For the reasons stated above, it is desirable that the optical system including the apertured reflecting mirror should satisfy the following condition (2):

$$r_{Hmin}/r_{Minc} \leq 0.5 \qquad (2)$$

where:

$r_{Hmin}$: the minimum value of the length from the optical axis to the reflecting mirror edge;

$r_{Minc}$: the radius of wavefront-converted illuminating light incident on the apertured reflecting mirror.

It should be noted that the optical system satisfying the condition (2) means the optical system extending from the light source to the objective.

It should be further noted that the aperture 25 in the present invention is in confocal relation to the focal position of the objective 7, and it is therefore extremely easy to perform confocal microscopic observation by detecting a confocal signal. In such a case, it is desirable that the shape and size of the aperture 25 should be made suitable for confocal observation. For example, the shape and size of the aperture 25 should preferably be selected in conformity to the Airy disk diameter of viewing light. When the aperture 25 is adapted for confocal observation, the size of the aperture 25 becomes small inevitably. Therefore, $(r_H/r_{Minc})$ also becomes extremely small. Hence, $\eta_H \approx 1$. Consequently, there is almost no loss of light.

The sixth and seventh scanning optical microscopes according to the present invention will be described below.

Regarding the sixth scanning optical microscope, a variation of the basic arrangement for minimizing the loss of light will be described below with reference to FIG. 14. Another LSM in which focal point movement is made by a wavefront converting element, and the loss of light is extremely small and hence a bright image can be obtained can be realized by the arrangement shown in FIG. 14.

A laser light source 6 emits illuminating light 2. The illuminating light 2 passes through a beam splitter 21. Then, the illuminating light 2 passes through a convex lens 30 to enter a prism 31 having a reflecting surface 32. The illuminating light is collected on the reflecting surface 32 and reflected therefrom. Then, the illuminating light, which is now a divergent beam, is incident on a reflection type wavefront converting element 26 where it is subjected to wavefront conversion. The illuminating light exiting the reflection type wavefront converting element 26 passes through the prism 31 having the reflecting surface 32. Then, the illuminating light is formed into an approximately parallel beam through a collimation lens 27 and collected on a sample 9 through an objective 7. Viewing light from the sample 9 travels along a path reverse to the above and is reflected by the beam splitter 21 and collected on a photodetector 29. The arrangement shown in FIG. 14 is similar to those shown in FIGS. 1, 8 and 9 in that the movement of the focal point and the correction of spherical aberration due to the focal point movement are made by the reflection type wavefront converting element 26, and the XY-scanning of the objective 7 is performed by the actuator 8.

In this system, an optical element having a reflecting surface disposed at the position where the convergent beam is collected, that is, the prism 31 having a reflecting surface, is used as a device for leading illuminating light to the reflection type wavefront converting element 26. Therefore, the loss of light is extremely small in contrast to the prior art systems shown in FIGS. 27 and 28, which use beam splitters. Reflected light from a region in the sample 9 that is conjugate to the reflecting surface 32 reaches the photodetector 29 as viewing light 3. Conversely, reflected light from anywhere other than the conjugate region does not reach the photodetector 29. That is, the system exhibits actions similar to those of a confocal optical system. By appropriately setting the size of the reflecting surface 32, a confocal effect can be obtained. The confocal effect is particularly useful for observation of a fluorescent sample. To perform fluorescence observation, it is desirable to use a dichroic mirror having appropriate wavelength characteristics in place of the beam splitter 21.

Figure 14:
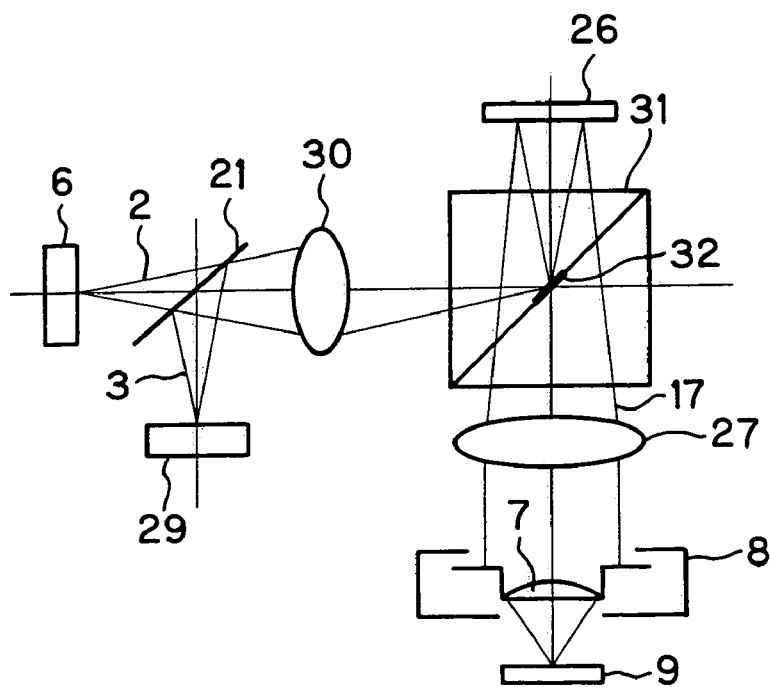
FIG. 14 is a diagram showing the arrangement of an embodiment of a laser scanning microscope having a reflection type wavefront converting element and a reflecting mirror.

An optical element having a reflecting surface, e.g. the foregoing prism 31 having a reflecting surface, is extremely effective in reducing the loss of light when focal point movement is effected by the reflection type wavefront converting element 26 not only in the objective scanning type LSM shown in FIG. 14 but also in a beam scan type LSM using a galvanometer mirror or the like.

Regarding the seventh scanning optical microscope according to the present invention, the reflecting mirror configuration will be described below with reference to FIGS. 15 and 16.

How the optical element with a reflecting surface shown in FIG. 14 can efficiently lead illuminating light to the wavefront converting element will be described below with reference to FIGS. 13, 15 and 16 in combination with FIG. 14.

In FIG. 14, the illuminating light 2 is converged through the lens 30 when entering the prism 31 having a reflecting surface. The converged illuminating light 2 is reflected by the reflecting surface 32 provided at the focal position of the lens 30. There is almost no loss of illuminating light 2 when reflected by the reflecting surface 32. The illuminating light 2 reflected from the reflecting surface 32 becomes a divergent beam and is then incident on the reflection type wavefront converting element 26. The illuminating light 2 reflected from the reflection type wavefront converting element 26 becomes a post-correction illuminating light 17. After further diverging, the post-correction illuminating light 17 passes through the prism 31 having a reflecting surface. At this time, a part of the illuminating light is reflected from the reflecting surface 32 instead of passing through it. The reflected part of the illuminating light is the loss of light.

Figure 15:
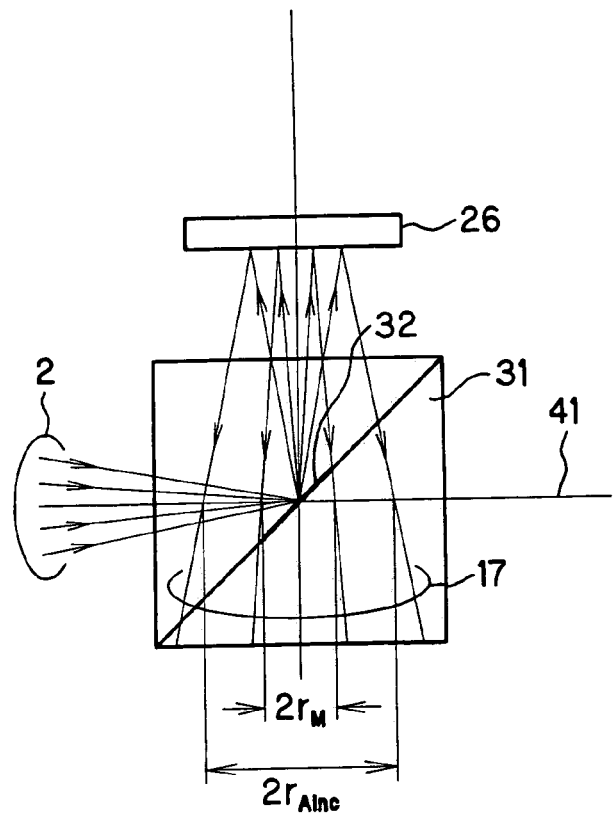
FIG. 15 is a diagram for describing the loss of light at the reflecting mirror shown in FIG. 14.

The way in which the loss of illuminating light is produced is shown in FIG. 15. The amount of light lost at the reflecting surface 32 can be evaluated at a plane 41 parallel to the reflection type wavefront converting element 26. Let us assume that the radius of an outline defined by the outer periphery of the beam of post-correction illuminating light 17 when intersecting the plane 41 is $r_{Ainc}$, and the radius of an outline of the post-correction illuminating light 17 reflected from the reflecting surface 32 that is defined on the plane 41 when the post-correction illuminating light 17 intersects the plane 41 is $r_M$. On this assumption, the amount of light in the range of the radius $r_M$ is the loss of the post-correction illuminating light 17. Let us further assume that illuminating light in the range extending from the radius $r_M$ to the beam radius $r_{Ainc}$ passes completely (100%) through the prism 31 having a reflecting surface, and the post-correction illuminating light 17 is a Gaussian beam with a beam radius $r_{Ainc}$ as shown in FIG. 13. On this assumption, the transmittance $\eta_M$ is determined in the same way as in the case of equation (8), which expresses the reflectance $\eta_H$ of the apertured reflecting mirror, shown in FIGS. 8 and 9. It is only necessary to replace $r_H$ and $r_{Minc}$ in equation (8) with $r_M$ and $r_{Ainc}$, respectively, as follows:

$$\eta_M = \{E(r_{Ainc}) - E(r_M)\}/E(r_{Ainc}) \qquad (9)$$
$$= \{\exp(2 - 2r_M^2/r_{Ainc}^2) - 1\}/\{\exp(2) - 1\}$$

The relationship between $\eta_M$ on the one hand and $r_{Ainc}$ and $r_M$ on the other in equation (9) is, needless to say, similar to the relationship between $\eta_H$ on the one hand and $r_{Minc}$ and $r_H$ on the other in equation (8). Therefore, the relationship between $(r_M/r_{Ainc})$ and nm agrees with the relationship between $(r_H/r_{Minc})$ and $\eta_H$ in Table 5.

Figure 16:
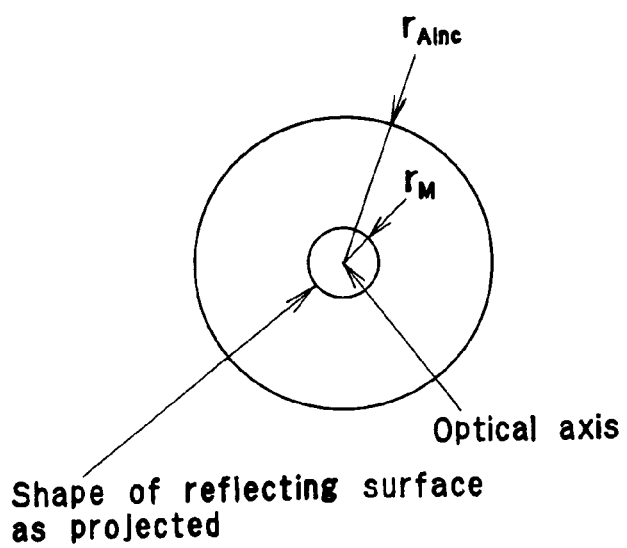
FIG. 16 is a diagram showing the beam diameter at a reflecting mirror and the shape of a reflecting surface as projected.

Although in the foregoing the shape of the reflecting surface in FIG. 16 has been described as a circle having a radius $r_M$, the shape of the reflecting surface for producing the above-described effect of minimizing the loss of light is not necessarily limited to the circular shape. For example, the shape of the reflecting surface may be elliptical, polygonal, a star-shape, a slit-like shape, or an irregular shape. Even if the reflecting surface has such a shape, the illuminating light can be efficiently led to the wavefront converting element as long as the optical axis extends within the reflecting surface. Further, the reflecting surface 32 does not always need to be formed on a light-transmitting member (a plane-parallel plate or a prism). For example, the reflecting surface 32 may be formed from a small reflecting member with a reflecting surface having a necessary area. In this case, the reflecting member may be supported by a support member. When the shape of the reflecting surface is not circular, the minimum value $r_{Mmin}$ of the length from the reflecting mirror edge to the optical axis should be regarded as $r_M$.

For the reasons stated above, it is desirable that the optical system including the reflecting surface should satisfy the following condition (3):

$$r_{Mmin}/r_{Ainc} \leq 0.5 \qquad (3)$$

where:
$r_{Mmin}$: the minimum value of the length from the optical axis to the reflecting mirror edge;
$r_{Ainc}$: the radius of wavefront-converted illuminating light at the position of the reflecting mirror.

Regarding the eighth scanning optical microscope according to the present invention, the minimization of the loss of light and the size reduction will be explained below with reference to FIGS. 17 and 18.

Figure 17:
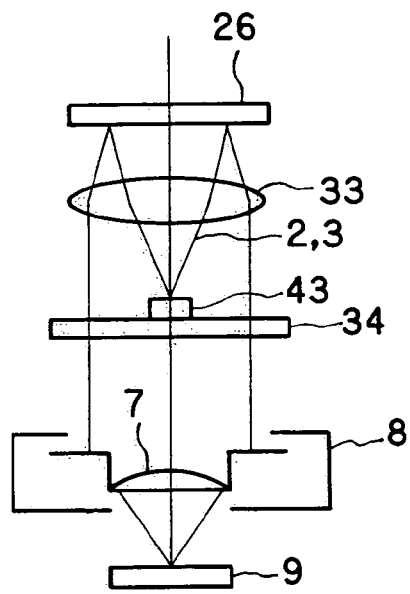
FIG. 17 is a diagram showing the arrangement of an embodiment of a laser scanning microscope having a reflection type wavefront converting element and an optical element serving as both a light-emitting part and a light-receiving part.

Another LSM in which focal point movement is made by a wavefront converting element, and the loss of light is extremely small and hence a bright image can be obtained can be realized by the arrangement shown in FIG. 17.

An optical element 43 is supported by a support member 34. The optical element 43 functions as both a light-emitting part and a light-receiving part. Illuminating light 2 emitted from the optical element 43 is incident on a reflection type wavefront converting element 26 through a collimation lens 33. The illuminating light 2 is subjected to wavefront conversion when reflected by the reflection type wavefront converting element 26. The reflected light passes through the collimation lens 33 to become an approximately parallel beam and is then collected on a sample 9 through an objective 7. Viewing light from the sample 9 travels along a path reverse to the above and is collected on the optical element 43. The arrangement shown in FIG. 17 is similar to those shown in FIGS. 1, 8, 9 and 14 in that the movement of the focal point and the correction of spherical aberration due to the focal point movement are made by the reflection type wavefront converting element 26, and the XY-scanning of the objective 7 is performed by the actuator 8.

In this system, the beam splitters used in the prior art shown in FIGS. 27 and 28 are eliminated by disposing the optical element 43, which serves as both a light-emitting part and a light-receiving part, in the optical path. In this case, the loss of light can be minimized by using an optical element and a support member that block a minimum of incident light as the optical element 43 and the support member 34. For example, if a semiconductor laser chip is used as the optical element 43, because its outer diameter is small, the area with which the optical element 43 blocks light is small even when it is disposed in the optical path as in this embodiment. Further, if the semiconductor laser chip is endowed with both the function of a light source and the function of a light-detecting element, it is possible to construct a laser feedback microscope. As the support member 34, a transparent substrate, e.g. a glass substrate, should preferably be used.

Figure 18:
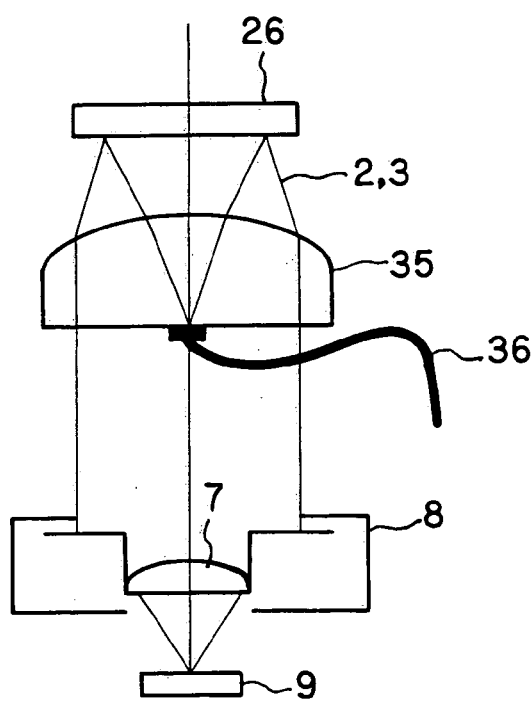
FIG. 18 is a diagram showing the arrangement of an embodiment of a laser scanning microscope having a reflection type wavefront converting element and an optical fiber.

FIG. 18 shows another embodiment of the eighth scanning optical microscope according to the present invention. In this embodiment, one end of an optical fiber 36 is attached to the center of a collimation lens 35. The other end of the optical fiber 36 is connected to a laser light source (not shown) and a photodetector (not shown). Accordingly, the end of the optical fiber 36 attached to the collimation lens 35 functions in the same way as the optical element 43 in FIG. 17. Because the optical fiber 36 can be formed with a small diameter, even if it is disposed in the optical path as in this embodiment, the area with which the optical fiber 36 blocks the light path is small. Thus, the loss of light can be minimized. The arrangement of the rest of this system is the same as that shown in FIG. 17. That is, the movement of the focal point and the correction of spherical aberration due to the focal point movement are made by the reflection type wavefront converting element 26, and the XY-scanning of the objective 7 is performed by the actuator 8.

The ninth scanning optical microscope according to the present invention will be described below with reference to FIGS. 19 and 20 and Table 6 below. The ninth scanning optical microscope is arranged such that illuminating light is incident obliquely on a wavefront converting element, as a variation of the arrangement for minimizing the loss of light.

Figure 19:
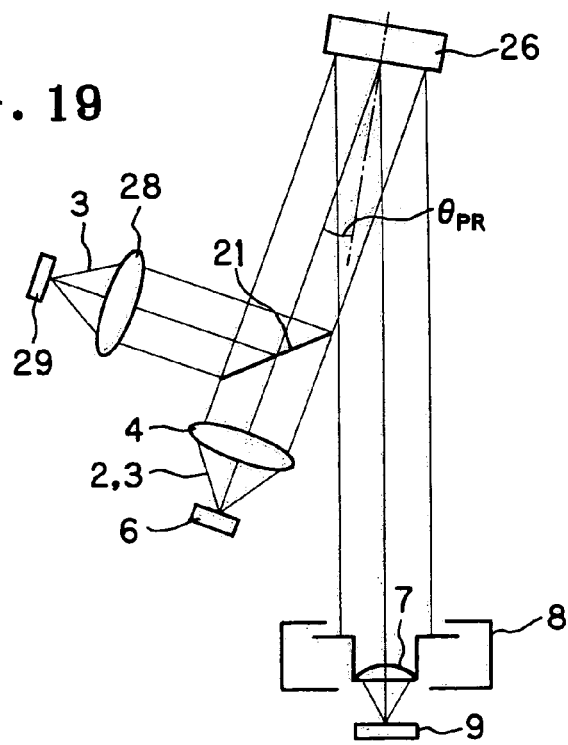
FIG. 19 is a diagram showing the arrangement of an embodiment of a laser scanning microscope in which a light beam is incident obliquely on a reflection type wavefront converting element.

An LSM in which focal point movement is made by a wavefront converting element, and there is no loss of light and hence a bright image can be obtained can be realized by the arrangement shown in FIG. 19. A laser light source 6 emits illuminating light 2. The illuminating light 2 is formed into a parallel beam through a collimation lens 4 and passes through a beam splitter 21. Then, the illuminating light 2 is incident on a reflection type wavefront converting element 26 at an incident angle $\theta_{PR}$. The illuminating light 2 is subjected to wavefront conversion when reflected by the reflection type wavefront converting element 26. The reflected illuminating light 2 is collected on a sample 9 through an objective 7. Viewing light from the sample 9 travels along a path reverse to the above and is reflected by the beam splitter 21 and collected on a photodetector 29 through a convex lens 28.

It should be noted that the ninth scanning optical microscope is similar to the foregoing laser scanning microscopes in that the movement of the focal point and the correction of spherical aberration due to the focal point movement are made by the reflection type wavefront converting element 26, and the XY-scanning of the objective 7 is performed by the actuator 8.

To perform fluorescence observation, it is desirable to use a dichroic mirror having appropriate wavelength characteristics in place of the beam splitter 21. In this case, fluorescent light can be detected more efficiently than in the case of the prior art shown FIG. 27. In addition, the illuminating light can be led to the sample more efficiently than in the case of the prior art shown in FIG. 28.

The above-described arrangement in which a light beam is incident obliquely on the reflection type wavefront converting element is extremely effective in minimizing the loss of light not only in the objective scanning type LSM shown herein but also in a beam scan type LSM using a galvanometer mirror or the like.

Figure 20:
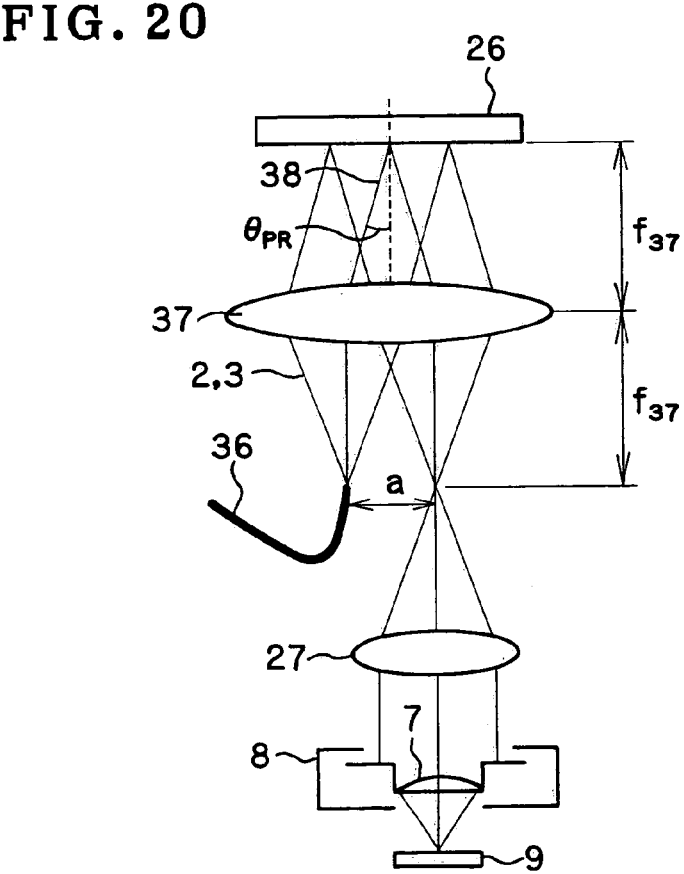
FIG. 20 is a diagram showing the arrangement of an embodiment of a laser scanning microscope in which a light beam is incident obliquely on a reflection type wavefront converting element through a collimation lens.

FIG. 20 shows another embodiment of the scanning optical microscope in which illuminating light is incident obliquely on the reflection type wavefront converting element. In this embodiment, one end of an optical fiber 36 is placed at a position away from the optical axis of an objective 7 by a distance a. The other end of the optical fiber 36 is connected to a laser light source (not shown) and a photodetector (not shown). Accordingly, the first-mentioned end of the optical fiber 36 functions as both a light-emitting part and a light-receiving part. Illuminating light 2 emerging from the optical fiber 36 is collimated through a convex lens 37 and incident on a reflection type wavefront converting element 26 at an incident angle $\theta_{PR}$. The illuminating light 2 is subjected to wavefront conversion when reflected by the reflection type wavefront converting element 26. The reflected illuminating light 2 passes through the convex lens 37 and then passes through a collimation lens 27 to become an approximately parallel beam. Then, the illuminating light 2 is collected on a sample 9 through an objective 7. Viewing light from the sample 9 travels along a path reverse to the above and is collected into the end of the optical fiber 36 and detected by the photodetector (not shown). This arrangement is similar to the foregoing in that the movement of the focal point and the correction of spherical aberration due to the focal point movement are made by the reflection type wavefront converting element 26, and the XY-scanning of the objective 7 is performed by the actuator 8.

With this arrangement, because the optical fiber 36 can be formed with a small diameter, the distance a shown in the figure can be minimized. Further, as the collimation lens 37, a lens having a long focal length $f_{37}$ can be used from the viewpoint of design. This means that it is possible to reduce the incident angle $\theta_{PR}$ with respect to the reflection type wavefront converting element 26. Thus, the arrangement is excellent from the viewpoint of image-forming performance (described below) Let us explain the relationship between the incident angle $\theta_{PR}$ and the image-forming performance. When the incident angle of light rays is 0°, the reflection type wavefront converting element can completely correct spherical aberration at the position where light is collected by performing wavefront conversion to provide a rotationally symmetric configuration. However, when the incident angle is large, an off-axis aberration component is produced. Consequently, it becomes impossible to make satisfactory aberration correction. As a result, the image quality degrades. However, the image quality degradation is so small that it is ignorable as long as the incident angle is within a certain range.

Accordingly, a simulation was performed to obtain the upper limit value of the incident angle $\theta_{PR}$ at which the Strehl ratio was 0.7 or more when focal point movement and spherical aberration correction were made with a reflection type wavefront converting element disposed at a tilt at a position conjugate to the pupil of an objective. The results of the simulation are shown in Tables 6 to 9 below. It should be noted that the objective used was an ideal objective of the infinity corrected type.

TABLE 6

[obliquely incident angle θ (°), (STR = 70%), $f_{OB}$ = 10 (mm), ΔZ = 0.05 (mm), pupil conjugate]

|  |  | NA | | |
| --- | --- | --- | --- | --- |
|  |  | 0.3 | 0.5 | 0.7 |
| Wavelength | 830 | 23 | 13 | 8.5 |
| (nm) | 546.07 | 18.5 | 10.5 | 7 |
|  | 248 | 11 | 7 | 4.5 |

TABLE 7

[obliquely incident angle θ (°), (STR = 70%), NA = 0.5, ΔZ = 0.05 (mm), wavelength 546.07 (nm), pupil conjugate]

|  | $f_{OB}$ (mm) | | |
| --- | --- | --- | --- |
|  | 3 | 10 | 20 |
| θ | 11 | 10.5 | 10.5 |

TABLE 8

[obliquely incident angle θ (°), (STR = 70%), NA = 0.5, $f_{OB}$ = 10 (mm), wavelength 546.07 (nm), pupil conjugate]

|  | ΔZ (mm) | | | |
| --- | --- | --- | --- | --- |
|  | 0.02 | 0.05 | 0.1 | 0.2 |
| θ | 16.5 | 10.5 | 7.5 | 5.5 |

TABLE 9

[obliquely incident angle θ (°), (STR = 70%), $f_{OB}$ = 3 (mm), ΔZ = 0.02 (mm), pupil conjugate]

|  |  | NA | | |
| --- | --- | --- | --- | --- |
|  |  | 0.3 | 0.5 | 0.7 |
| Wavelength | 830 | 35 | 20.5 | 14 |
| (nm) | 546.07 | 29 | 17 | 11.5 |
|  | 248 | 20 | 11.5 | 7.5 |

It will be understood from the above that the upper limit of $\theta_{PR}$ is a function of NA, wavelength and ΔZ and unrelated to the focal length $f_{OB}$ of the objective. The upper limit of $\theta_{PR}$ is given by the following formula (4):

$$\theta_{PR} \leq 50 \cdot NA^{-1} \sqrt{(\lambda \cdot \Delta Z^{-1})} \tag{4}$$

where:
- $\theta_{PR}$: the angle (°) of incidence of the principal ray on the wavefront converting element;
- $\Delta Z$: the amount of focal point movement;
- $\lambda$: the wavelength of the illuminating light;
- NA: the numerical aperture of the objective.

Figure 21:
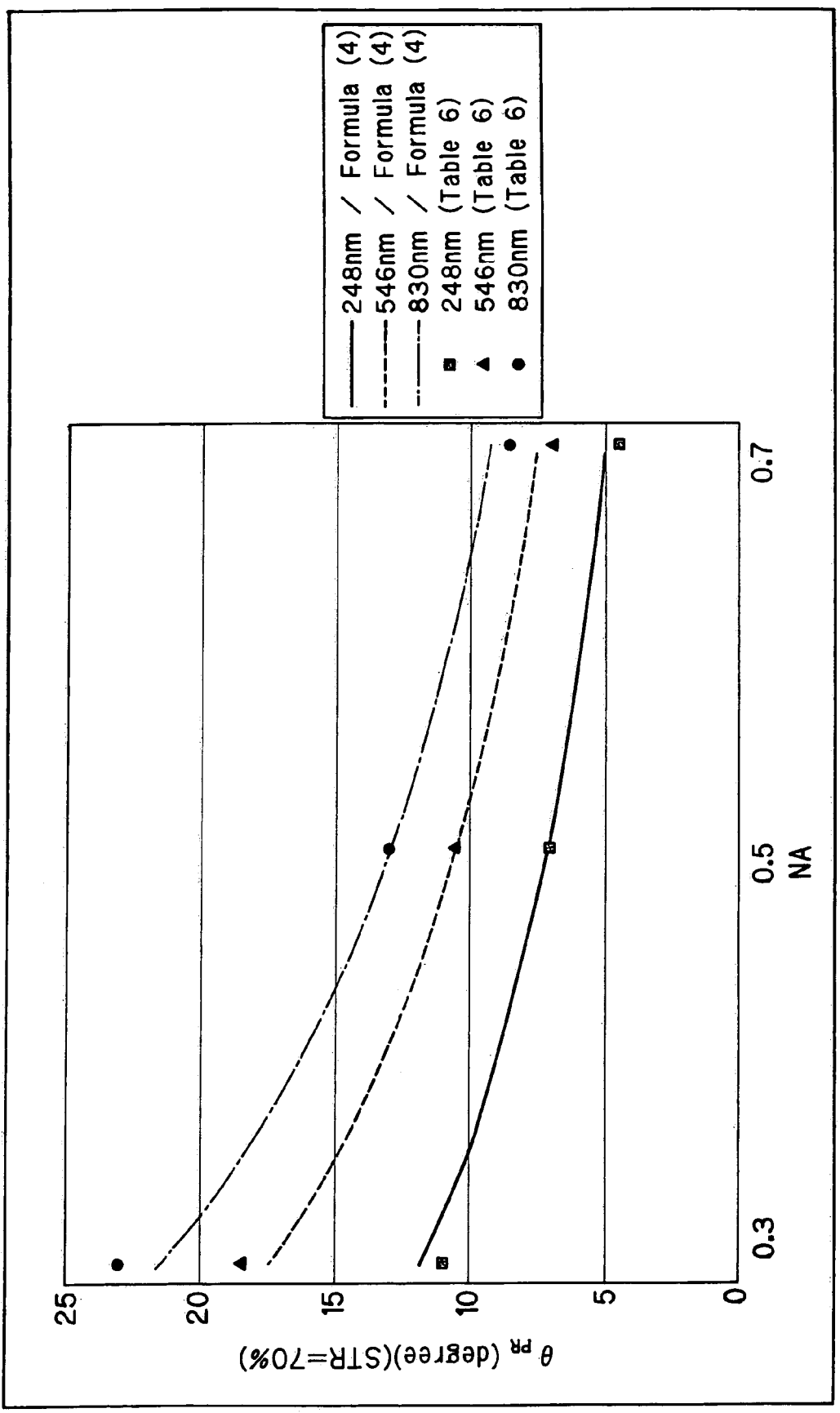
FIG. 21 is a graph showing the results of simulation for obtaining an obliquely incident angle $\Delta\theta_{PR}$ [when ΔZ=0.05 (mm)] at which the Strehl ratio is 0.7 or more, together with the curves of formula (4).
Figure 22:
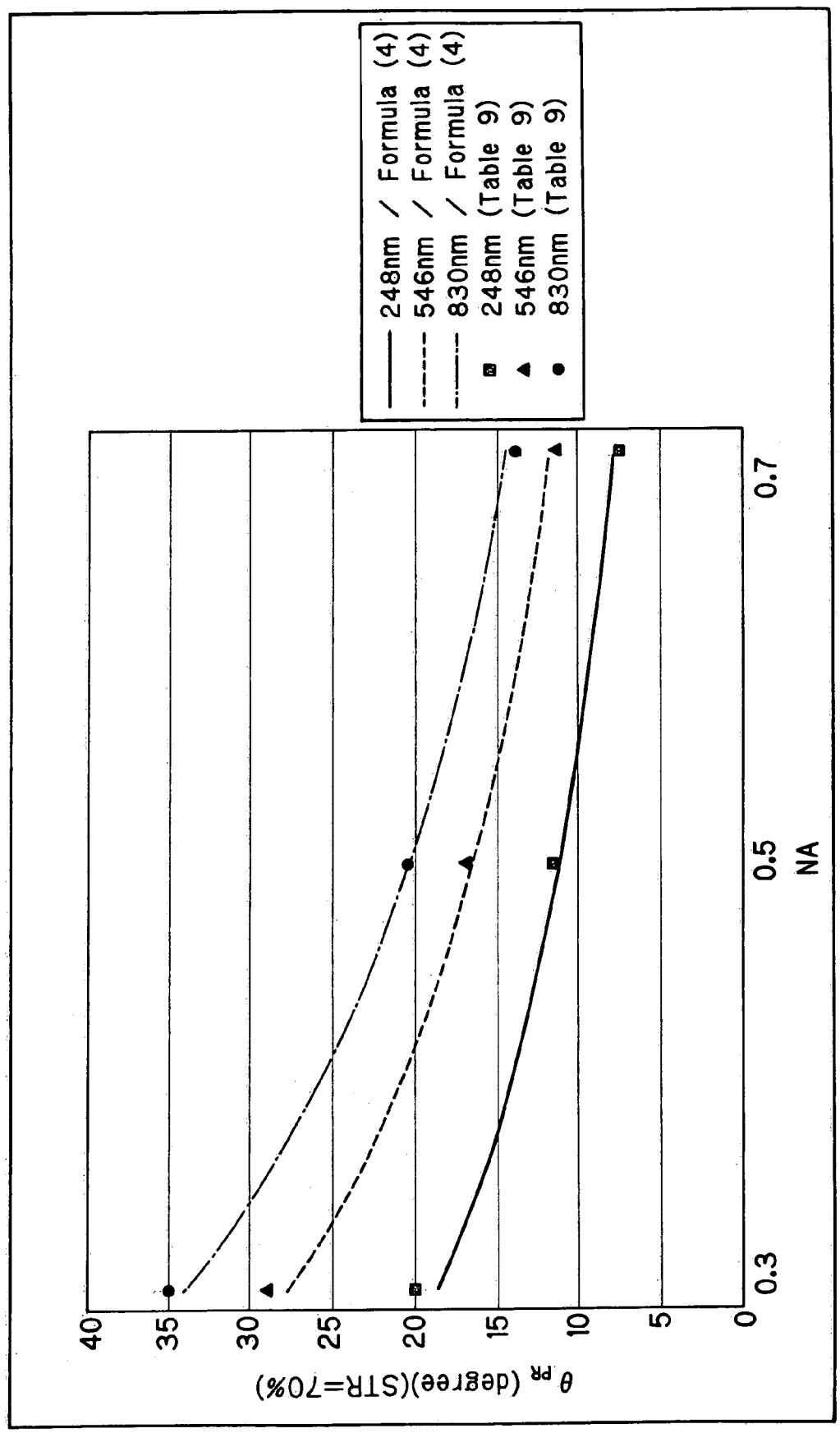
FIG. 22 is a graph showing the results of simulation for obtaining an obliquely incident angle $\Delta\theta_{PR}$ [when ΔZ=0.02 (mm)] at which the Strehl ratio is 0.7 or more, together with the curves of formula (4).

The results shown in Table 6 and 9 above, together with the curves of the above formula (4), are shown in FIGS. 21 and 22, respectively.

It will be understood from FIGS. 21 and 22 that the curves of formula (4) agree with the results shown in Tables 6 and 9. That is, the incident angle $\theta_{PR}$ with respect to the reflection type wavefront converting element can be determined from formula (4).

Regarding the tenth scanning optical microscope according to the present invention, the scheme of minimizing the loss of light by using a toric surface will be described below with reference to FIGS. 23 to 26, together with Table 10 below.

Figure 23:
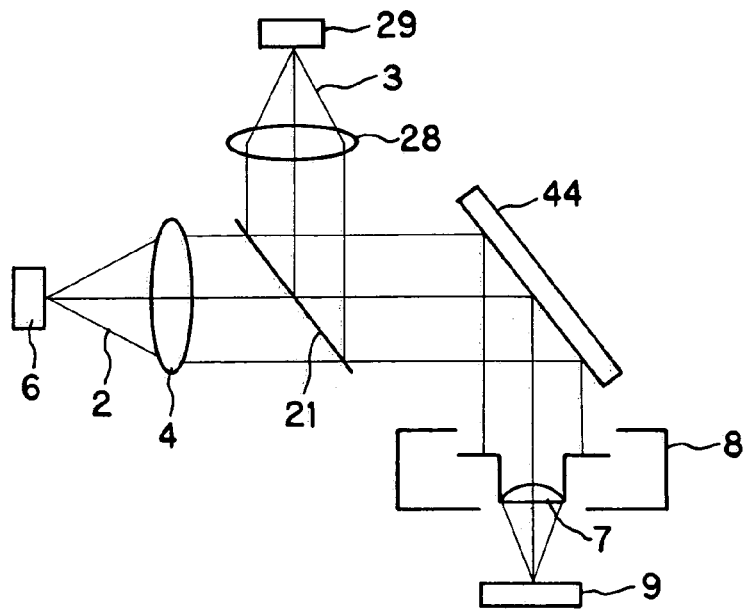
FIG. 23 is a diagram showing the arrangement of an embodiment of a laser scanning microscope using a reflection type wavefront converting element having an aspherical toric surface.

Another LSM in which focal point movement is made by a wavefront converting element, and there is no loss of light and hence a bright image can be obtained can be realized by the arrangement shown in FIG. 23. It should be noted that the term "aspherical toric surface" as used in the following description means a surface configuration which has two planes of symmetry perpendicularly intersecting each other and in which a curve intersecting these planes of symmetry is expressed by an aspherical sectional configuration.

A laser light source 6 emits illuminating light 2. The illuminating light 2 is formed into a parallel beam through a collimation lens 4 and passes through a beam splitter 21. Then, the illuminating light 2 is incident obliquely on a reflection type wavefront converting element 44 controllable into an aspherical toric surface configuration (hereinafter referred to as "toric wavefront converting element 44"). The illuminating light 2 is subjected to wavefront conversion when reflected by the toric wavefront converting element 44. The reflected illuminating light 2 is collected on a sample 9 through an objective 7. Viewing light from the sample 9 travels along a path reverse to the above and is reflected by the beam splitter 21 and collected on a photodetector 29 through a convex lens 28.

In this system, focal point movement and the correction of spherical aberration due to the focal point movement are made by the toric wavefront converting element 44.

Further, the XY-scanning of the objective 7 is performed by an actuator 8 in the same way as in the foregoing laser scanning microscopes.

To perform fluorescence observation, it is desirable to use a dichroic mirror having appropriate wavelength characteristics in place of the beam splitter 21.

The above-described arrangement in which a light beam is incident obliquely on the toric wavefront converting element 44 is extremely effective in reducing the loss of light not only in the objective scanning type LSM shown herein but also in a beam scan type LSM using a galvanometer mirror or the like.

Let us explain why an aspherical toric surface is used as the surface configuration of the wavefront converting element.

When a reflection type wavefront converting element is used in the arrangement shown in FIG. 23 to make focal point movement, it is desirable to control the surface configuration of the wavefront converting element into a free-form surface configuration from the viewpoint of correcting aberrations completely. However, because a free-form surface has no symmetry in configuration, it is not easy to realize a necessary free-form surface configuration precisely with an accuracy on the order of the wavelength of light. Incidentally, the inventor of this application analyzed the configuration of the reflection type wavefront converting element actually required in the arrangement shown in FIG. 23 and, as a result, found that the required configuration is certainly a free-form surface in the strict sense of the term, but it has high symmetry and is extremely close to an aspherical toric surface. This will be explained below with reference to FIGS. 24 to 26.

Figure 24:
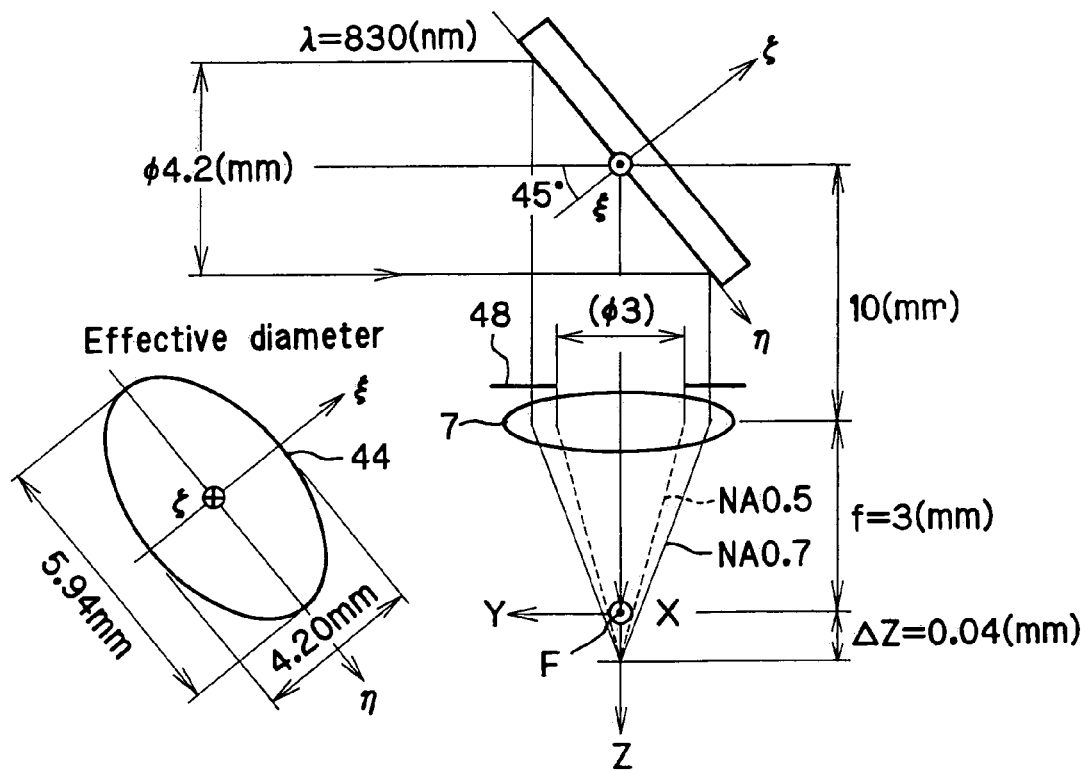
FIG. 24 is a diagram showing a simulation model of an objective scanning microscope having a reflection type wavefront converting element with an aspherical toric surface.

FIG. 24 shows a model of an objective scanning microscope having a reflection type wavefront converting element 44. A parallel illuminating light beam having a beam diameter of 4.2 mm and a wavelength of 830 nm is incident on the reflection type wavefront converting element 44 at an incident angle of 45°. The reflection type wavefront converting element 44 has an elliptical effective-diameter area with a major diameter of 5.94 mm and a minor diameter of 4.20 mm. The illuminating light is subjected to wavefront conversion, and the optical path thereof is bent through 90° by the reflection type wavefront converting element 44. The reflected illuminating light enters an objective 7 positioned away from the reflection type wavefront converting element 44 by 10 mm on the optical axis. The objective 7 is an ideal objective having a focal length of 3 mm and NA of 0.7. The surface configuration of the reflection type wavefront converting element 44 is formed so that the position where light is collected by the objective 7 shifts to a position away from the object-side focal point F by $\Delta Z = 0.04$ (mm). Let us make a comparison between a case where the surface configuration of the reflection type wavefront converting element 44 is a free-form surface and a case where it is an aspherical toric surface.

Figure 25:
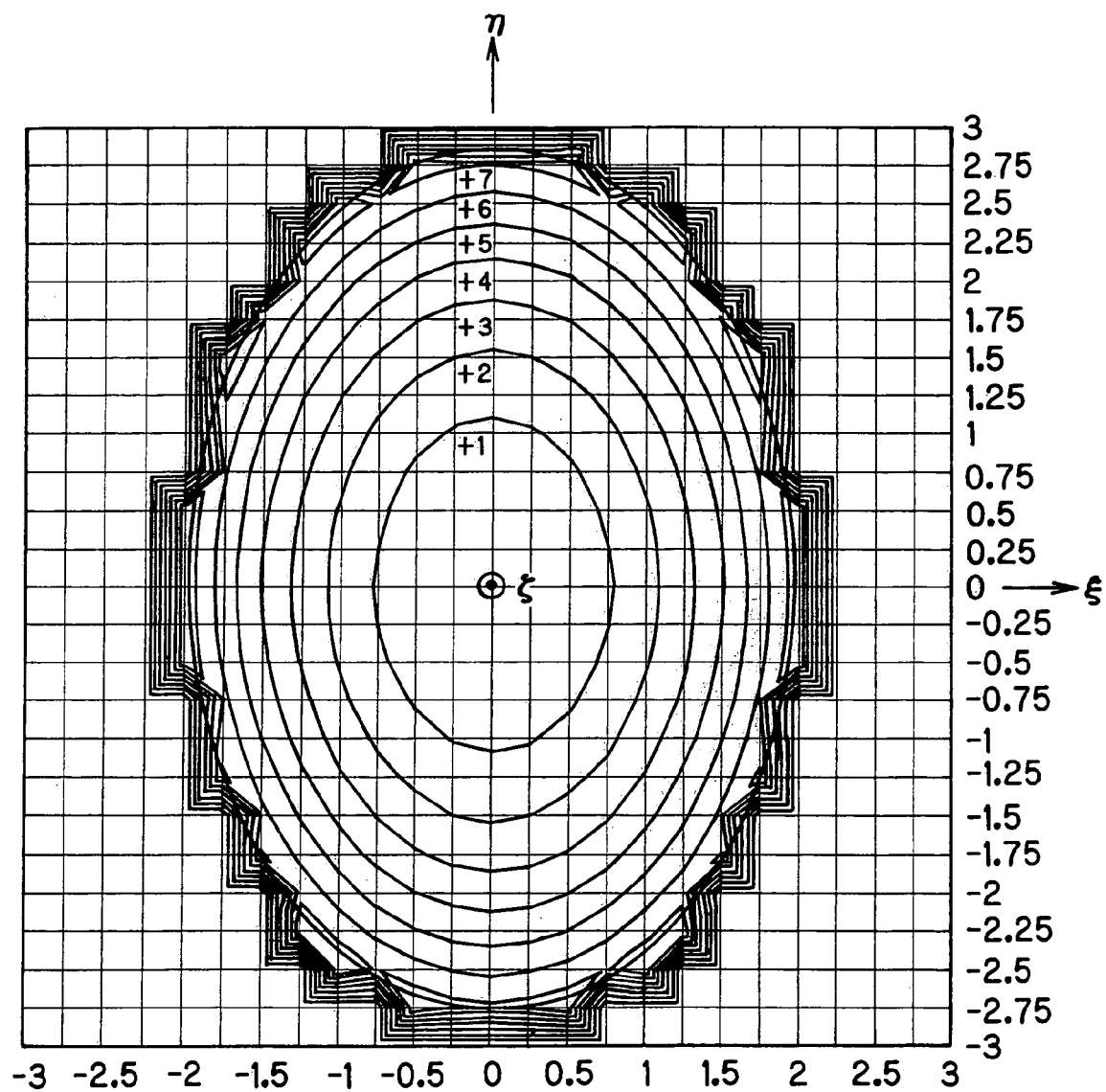
FIG. 25 is a contour map showing an optimized reflecting surface configuration when a free-form surface type reflection wavefront converting element is used.
Figure 26:
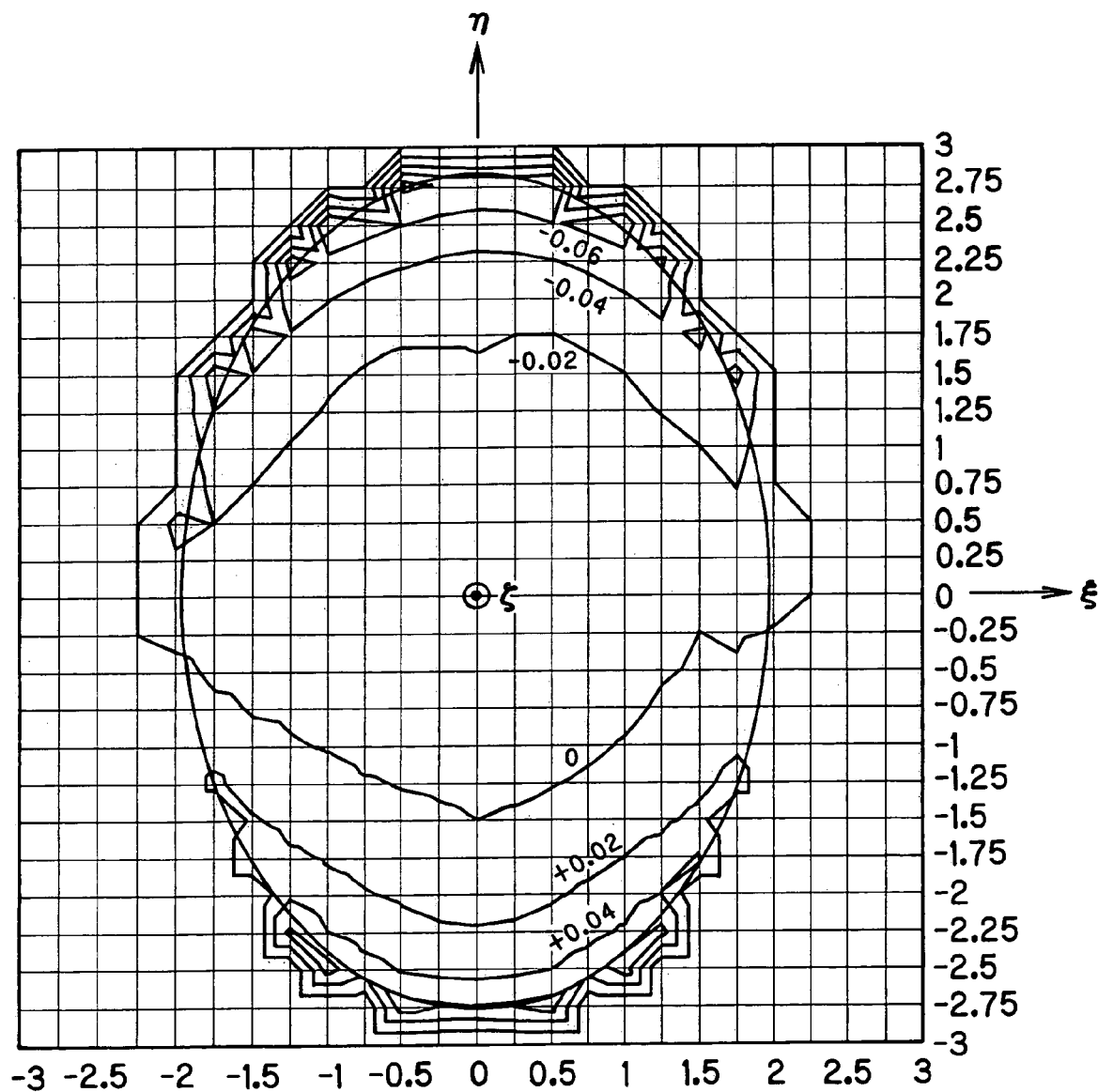
FIG. 26 is a contour map showing a reflecting surface configuration obtained by subtracting an optimized toric surface from the optimized free-form surface shown in FIG. 25.

FIG. 25 is a contour map (units: $\mu$m) showing the reflecting surface configuration when the surface configuration of the reflection type wavefront converting element 44 is a free-form surface. FIG. 26 is a contour map showing a reflecting surface configuration obtained by subtracting an aspherical toric surface configuration having planes of symmetry in the $\xi$-$\zeta$ and $\eta$-$\zeta$ planes from the above-described free-form surface. It should be noted that in FIGS. 25 and 26 the elliptical area with a major diameter of 5.6 mm and a minor diameter of 3.9 mm is shown by the bold line. Contour lines within the elliptical area are shown by the thin lines. It is observed in FIG. 25 that the reflecting surface configuration has a slightly asymmetric component with respect to the $\xi$-$\zeta$ plane (it is obvious that the reflecting surface configuration is symmetric with respect to the $\eta$-$\zeta$ plane). The maximum displacement is 8 $\mu$m.

On the other hand, the maximum displacement in FIG. 26 is +0.04 $\mu$m on the plus side and −0.06 $\mu$m on the minus side. Either of the displacements is less than 1% of the maximum displacement of the above-described free-form surface, i.e. 8 $\mu$m.

Let us show that the difference in configuration between the aspherical toric surface and the free-form surface gives rise to no problem in practical application.

In FIG. 24, a stop 48 with an aperture diameter of 3 mm was added to the objective 7 with the toric wavefront converting element 44 placed as illustrated in the figure, and the stop 48 and the objective 7 were scanned together as one unit along the XY-directions. With this setup, the Strehl ratio was obtained. The results of the experiment are shown in Tables 10(a) and 10(b) below. In the tables, ΔY denotes the scan range in the Y-direction. Regarding the distribution of the image-forming characteristics in the XY-directions, it is obvious that the distribution is asymmetric with respect to the X-axis but symmetric with respect to the Y-axis. Therefore, in Table 10(a), the Strehl ratio was obtained in the ΔX range of 0 to +0.5 (mm). In Table 10(b), the Strehl ratio was obtained in the ΔY range of −0.5 to +0.5 (mm).

TABLE 10(a)

[$f_{OB}$ = 3 (mm), NA = 0.5, wavelength 830 (nm), ΔZ = 0.04 (mm), ΔY = 0 (mm)]

| ΔX (mm) | STR |
|---|---|
| 0 | 0.997 |
| 0.2 | 0.935 |
| 0.4 | 0.754 |
| 0.5 | 0.628 |

TABLE 10(b)

[$f_{OB}$ = 3 (mm), NA = 0.5, wavelength 830 (nm), ΔZ = 0.04 (mm), ΔX = 0 (mm)]

| ΔY (mm) | STR |
|---|---|
| 0.5 | 0.585 |
| 0.4 | 0.715 |
| 0.2 | 0.912 |
| 0 | 0.997 |
| −0.2 | 0.958 |
| −0.4 | 0.793 |
| −0.5 | 0.672 |

It will be understood from the above that the Strehl ratio is 0.7 or more in the ΔX range of ±0.4 (mm) and in the ΔY range of ±0.4 (mm), and satisfactory image-forming performance can be obtained even with an aspherical toric surface in these ranges.

Scanning optical microscopes, e.g. laser scanning microscopes (LSMs), using a wavefront converting element according to the present invention provide the following advantageous effects.

With the first scanning optical microscope, scanning along a direction perpendicular to the optical axis is performed by scanning the objective. Therefore, even when focal point movement is performed by the wavefront converting element, degradation of off-axis image-forming performance is minimized. Moreover, from the viewpoint of the arrangement of the system, the objective pupil need not be conjugate to the wavefront converting element.

With the second scanning optical microscope, when the objective is scanned along a direction perpendicular to the optical axis, it-is unnecessary to change the wavefront conversion applied to illuminating light by the wavefront converting element. Therefore, the drive control of the wavefront converting element is facilitated.

The third scanning optical microscope makes it possible to obtain an LSM that performs focal point movement by a wavefront converting element and has favorable image-forming characteristics.

The fourth to seventh scanning optical microscopes make it possible to obtain an LSM suffering a minimum loss of light despite the use of a reflection type wavefront converting element.

The eighth scanning optical microscope makes it possible to obtain an LSM suffering a minimum loss of light and compact in size despite the use of a reflection type wavefront converting element.

The ninth and tenth scanning optical microscopes make it possible to obtain an LSM free from loss of light despite the use of a reflection type wavefront converting element.

What we claim is:

1. A scanning optical microscope comprising:
   a light source;
   an optical element having a positive power for convening illuminating light emitted from said light source into a convergent beam;
   a reflecting mirror with an aperture, wherein the reflecting mirror being located substantially at a position where the illuminating light is converged into the convergent beam by the optical element;
   a reflection type wavefront converting element for applying a desired wavefront conversion to said illuminating light passing through the aperture in said reflecting mirror, wherein said wavefront converting element reflects the wavefront convened illuminating light and the wavefront-converted illuminating light is reflected at said reflecting mirror;
   an objective for collecting said wavefront-convened illuminating light reflected at said reflecting mirror onto a sample; and a detector for detecting signal light emitted from said sample.

2. A scanning optical microscope according to claim 1, wherein an optical system including said reflecting minor with an aperture satisfies the following condition (2):

$$r_{Hmin}/r_{minc} \leq 0.5 \quad (2)$$

where:
   $r_{Hmin}$: a minimum value of a length from an optical axis to a reflecting mirror edge;
   $r_{minc}$: a radius of wavefront-converted illuminating light incident on the reflecting mirror with an aperture.

* * * * *